United States Patent

[11] 3,619,583

[72] Inventor Thomas F. Arnold
Plainfield, N.J.

[21] Appl. No. 766,922
[22] Filed Oct. 11, 1968
[45] Patented Nov. 9, 1971
[73] Assignee Bell Telephone Laboratories Incorporated
Murray Hill, N.J.

[54] MULTIPLE FUNCTION PROGRAMMABLE ARRAYS
19 Claims, 39 Drawing Figs.

[52] U.S. Cl. .......... 235/152, 307/203, 328/92
[51] Int. Cl. .......... G06f 1/02
[50] Field of Search .......... 235/152; 328/158, 92, 97; 307/203, 246; 340/172.5

[56] References Cited

UNITED STATES PATENTS 3,229,115 1/1966 Amarel .......... 235/152 X
3,473,160 10/1969 Wahlstrom .......... 340/172.5
3,484,701 12/1969 Friedman .......... 328/92

OTHER REFERENCES

Hennie Interative Arrays of Logical Circuits 1961 pp. 3– 8 & 114–124

*Primary Examiner*—Eugene G. Botz
*Assistant Examiner*—David H. Malzahn
*Attorneys*—R. J. Guenther and Kenneth B. Hamlin

ABSTRACT: A circuit for generating an arbitrary sequential switching function includes an array comprising regularly interconnected identical logic modules, each of which has a memory associated with it. Adaptations made at an edge of a two-dimensional construction of the array program the circuit to generate a particular sequence of output signals in response to a sequence of input signals. Feedback paths may be included to increase the function-generating capability of the circuit.

INVENTOR
T. F. ARNOLD
BY Lucian C. Canepa
ATTORNEY

| | 0 | 1 | Z |
|---|---|---|---|
| 1 | 2 | 1 | 0 |
| 2 | 3 | 1 | 0 |
| 3 | 4 | 1 | 1 |
| 4 | 4 | 5 | 1 |
| 5 | 2 | 1 | 1 |

| | 0 | 1 | |
|---|---|---|---|
| 12345 | 234 | 15 | BLOCK 1 |
| 234 | 34 | 15 | BLOCK 2 |
| 15 | 2 | 1 | |
| 34 | 4 | 15 | BLOCK 3 |
| 15 | 2 | 1 | |
| 2 | 3 | 1 | |
| 1 | 2 | 1 | |
| 4 | 4 | 5 | BLOCK 4 |
| 15 | 2 | 1 | |
| 2 | 3 | 1 | |
| 1 | 2 | 1 | |
| 3 | 4 | 1 | |

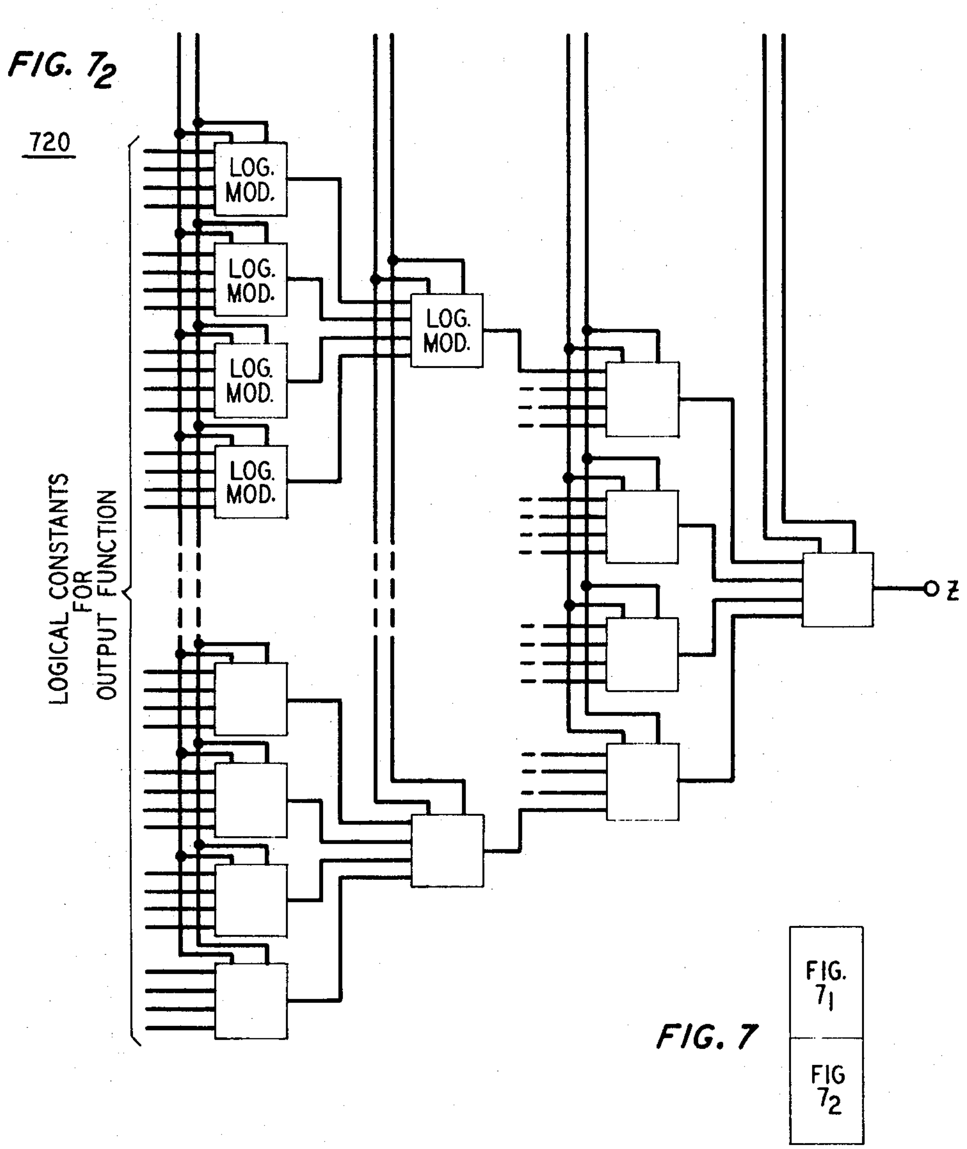
FIG. $7_2$, FIG. 7
FIG. 6
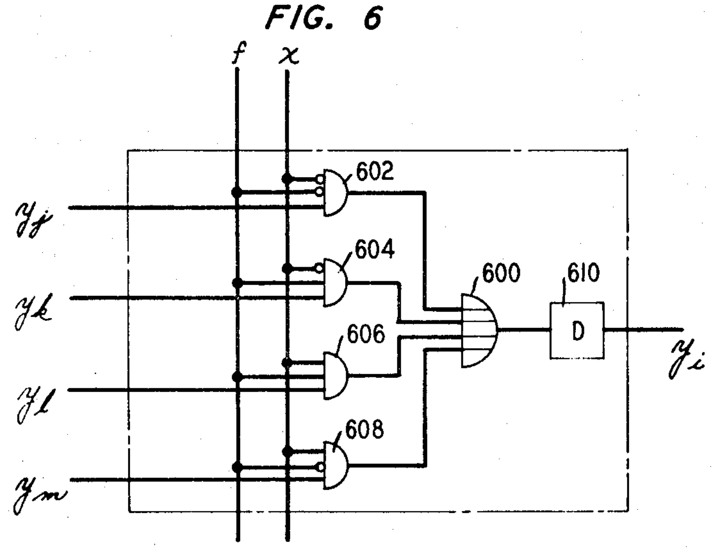

FIG. $7_1$
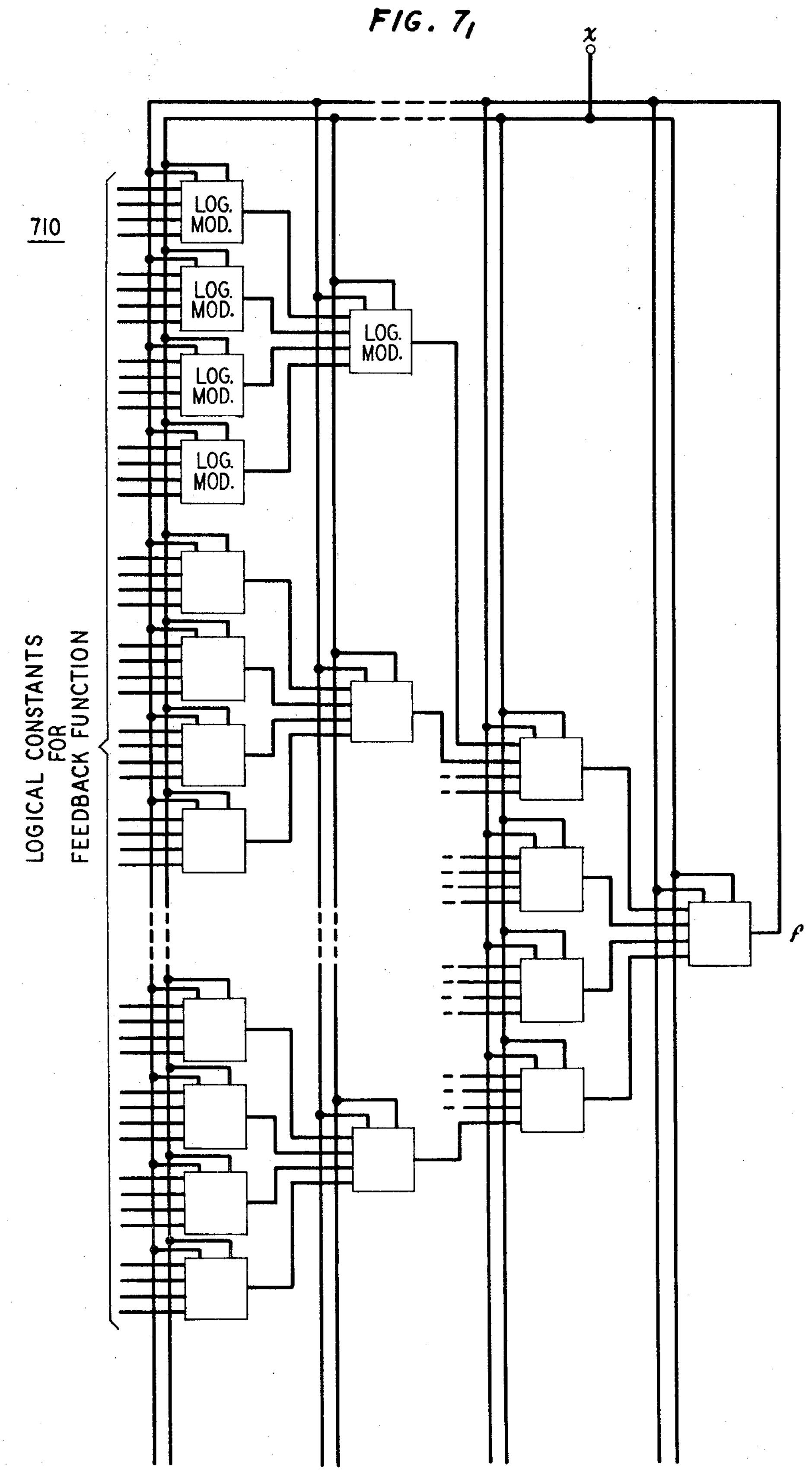

| | 0 | 1 | Z |
|---|---|---|---|
| 1 | 4 | 4 | 1 |
| 2 | 2 | 3 | 0 |
| 3 | 4 | 2 | 0 |
| 4 | 1 | 5 | 1 |
| 5 | 4 | 3 | 1 |

| | 0 | 1 | Z | f |
|---|---|---|---|---|
| 1 | 4 | 4 | 1 | 0 |
| 2 | 2 | 3 | 0 | 1 |
| 3 | 4 | 2 | 0 | 0 |
| 4 | 1 | 5 | 1 | 1 |
| 5 | 4 | 3 | 1 | 1 |

| Xf | 00 | 01 | 11 | 10 | |
|---|---|---|---|---|---|
| 12345 | 4 | 124 | 35 | 24 | BLOCK 1 |
| 4 | — | 1 | 5 | — | BLOCK 2 |
| 124 | 4 | 12 | 35 | 4 | |
| 35 | 4 | 4 | 3 | 2 | |
| 24 | — | 12 | 35 | — | |
| 1 | 4 | — | — | 4 | BLOCK 3 |
| 5 | — | 4 | 3 | — | |
| 4 | — | 1 | 5 | — | |
| 12 | 4 | 2 | 3 | 4 | |
| 35 | 4 | 4 | 3 | 2 | |
| 2 | — | 2 | 3 | — | |
| 3 | 4 | — | — | 2 | |

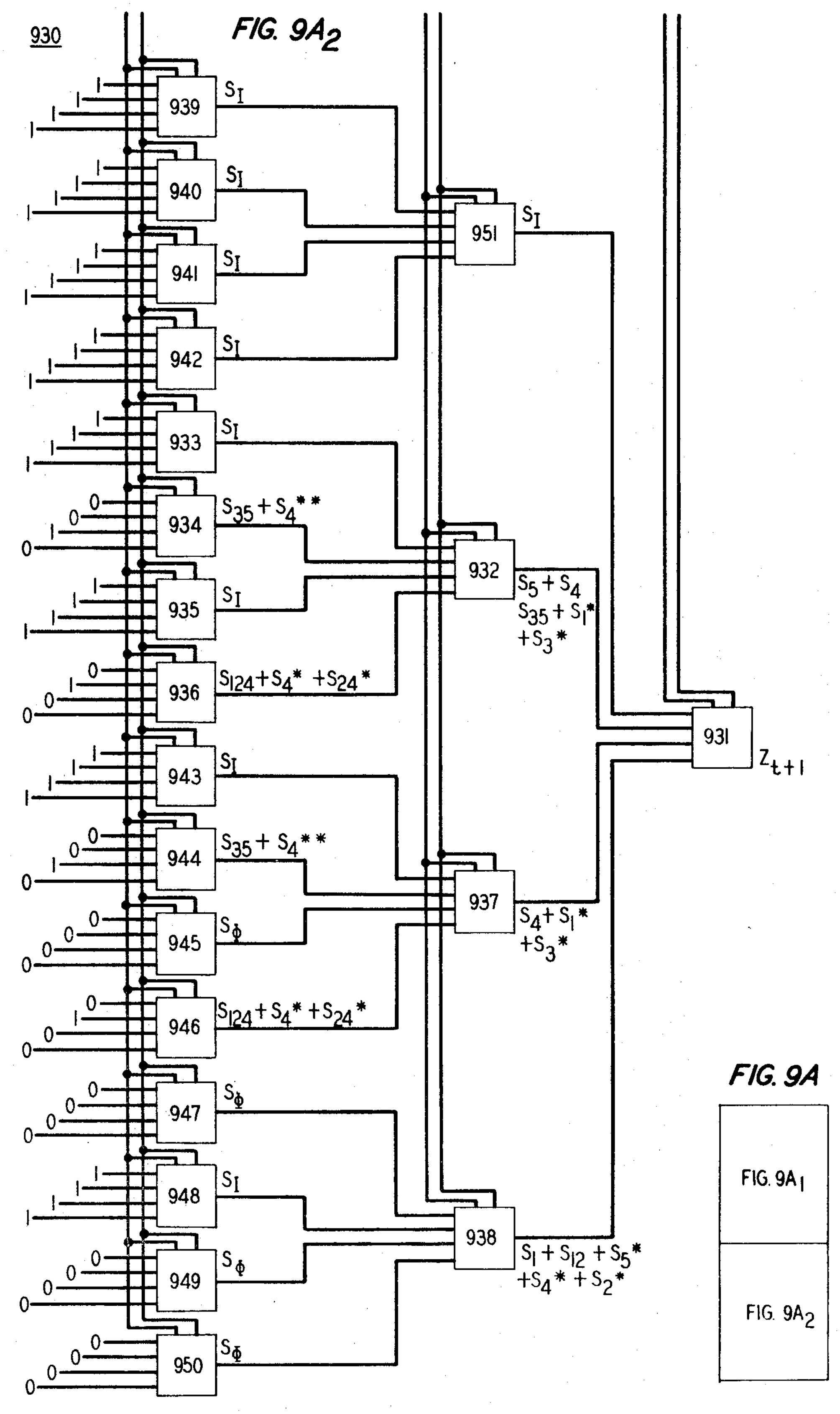
FIG. $9A_2$, FIG. 9A

FIG. 9A1
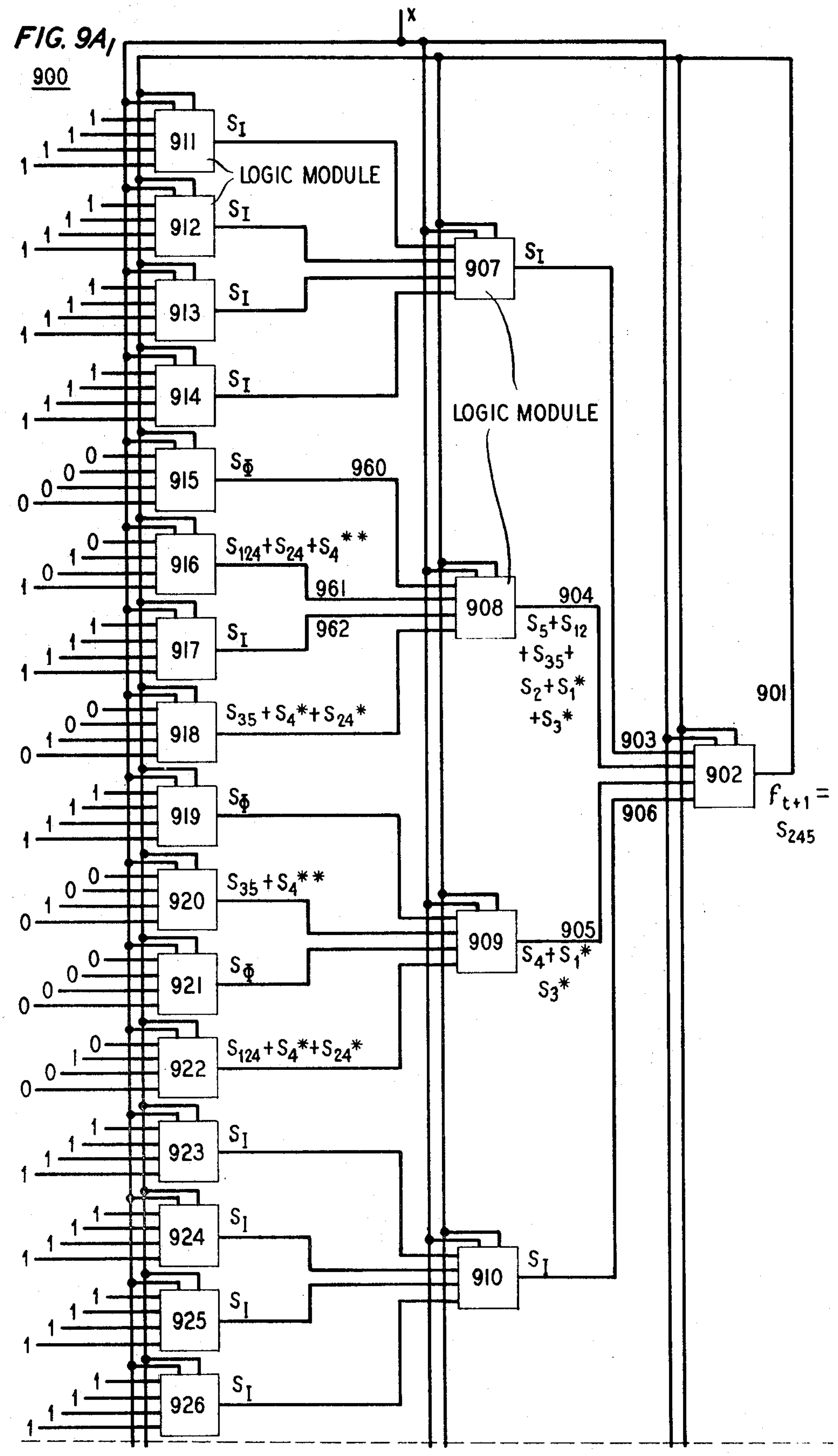

FIG. 9B
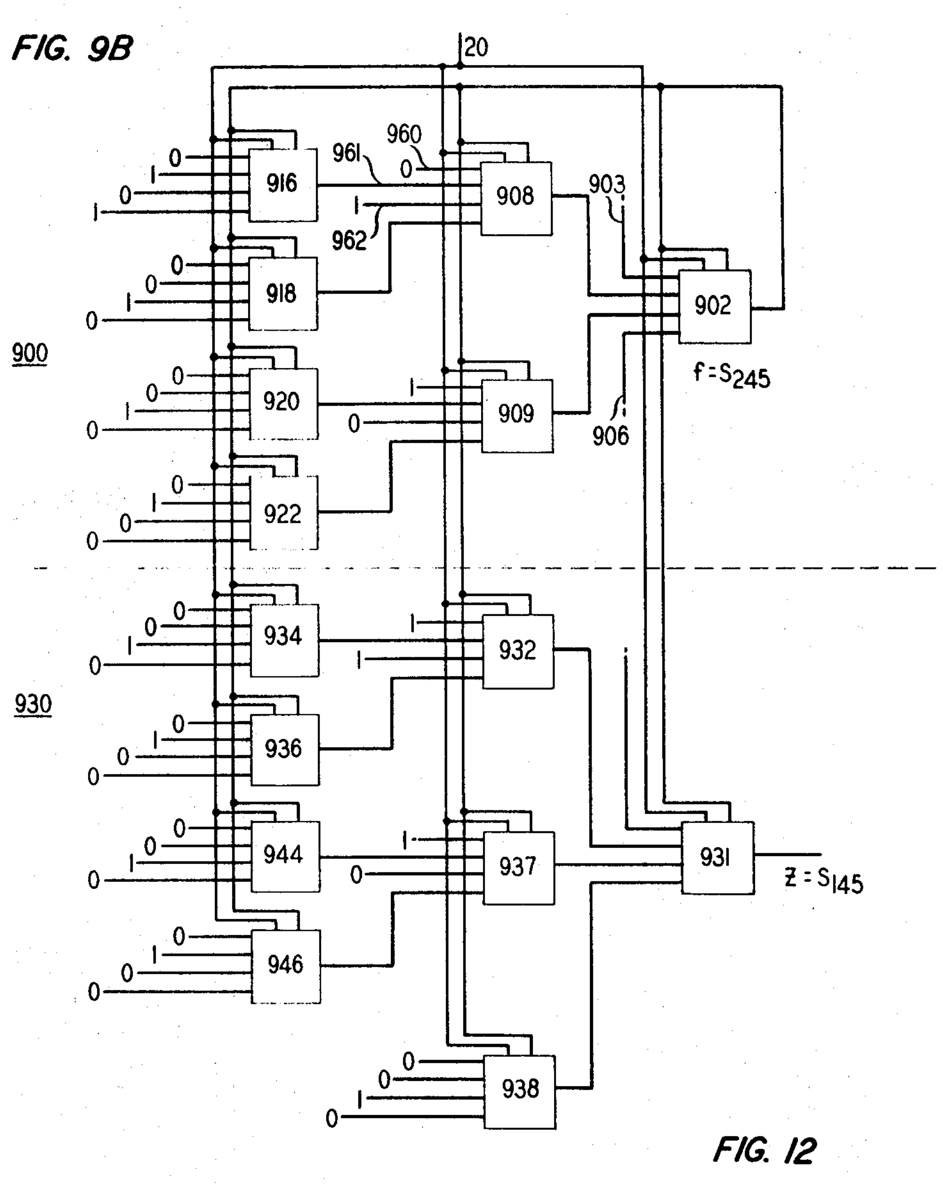
FIG. 12
| A | B | C | Q |
|---|---|---|---|
| 0 | 0 | 0 | 0 |
| 0 | 1 | 0 | 1 |
| 1 | 0 | 0 | 1 |
| 1 | 1 | 1 | 0 |
FIG. 11
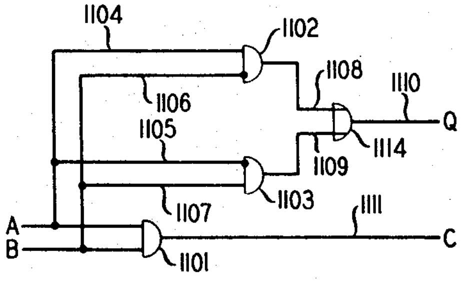

FIG. 16
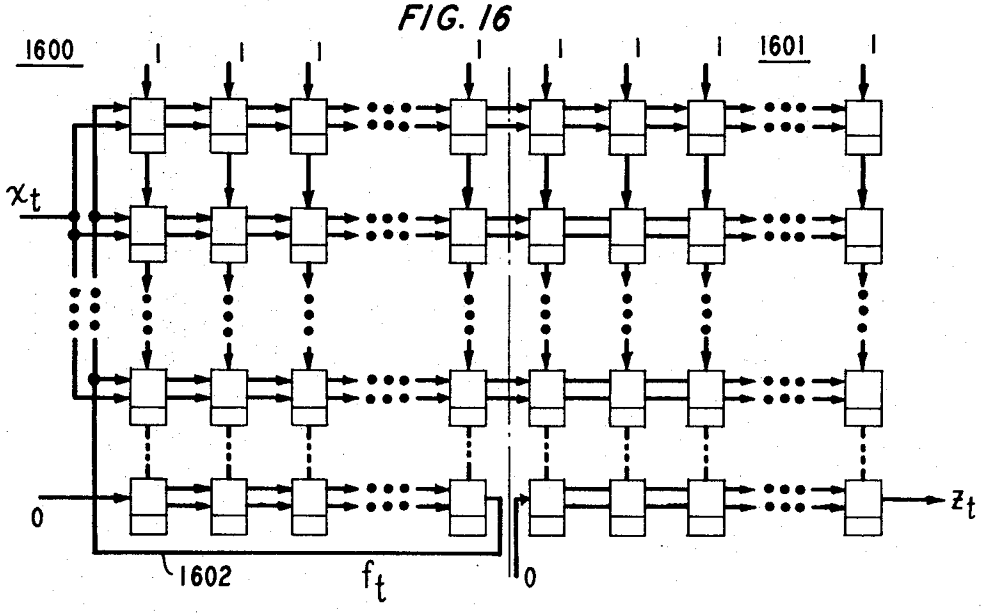
FIG. 17A
| | x 0 | 1 | z |
|---|---|---|---|
| 1 | 4 | 4 | 1 |
| 2 | 2 | 3 | 0 |
| 3 | 4 | 3 | 0 |
| 4 | 1 | 5 | 1 |
| 5 | 4 | 3 | 1 |
FIG. 17B
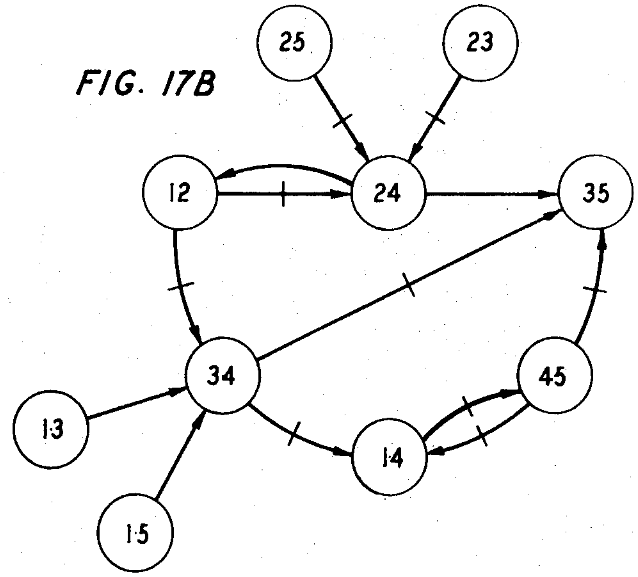
FIG. 17C
| | x 0 | 1 | z | f |
|---|---|---|---|---|
| 1 | 4 | 4 | 1 | 0 |
| 2 | 2 | 3 | 0 | 1 |
| 3 | 4 | 3 | 0 | 0 |
| 4 | 1 | 5 | 1 | 1 |
| 5 | 4 | 3 | 1 | 0 |
FIG. 17D
| xf | 00 | 01 | 11 | 10 |
|---|---|---|---|---|
| 12345 | 4 | 12 | 35 | 34 |
| 4 | — | 1 | 5 | — |
| 12 | 4 | 2 | 3 | 4 |
| 35 | 4 | – | – | 3 |
| 34 | 4 | 1 | 5 | 3 |

| | X 0 | 1 | 2 | f |
|---|---|---|---|---|
| 1 | 2 | 1 | 1 | 0 |
| 2 | 3 | 1 | 0 | 0 |
| 3 | 4 | 1 | 1 | 1 |
| 4 | 1 | 1 | 0 | 1 |

| | X f | 00 | 01 | 11 | 10 |
|---|---|---|---|---|---|
| BLOCK 1 | 1234 | 23 | 14 | 1 | 1 |
| BLOCK 2 | 23 | 3 | 4 | 1 | 1 |
| | 14 | 2 | 1 | 1 | 1 |
| | 1 | 2 | – | – | 1 |

MULTIPLE FUNCTION PROGRAMMABLE ARRAYS

This invention relates to logic function generating circuits and more particularly to iteratively realized synchronous sequential switching circuits.

GENERAL BACKGROUND AND PRIOR ART

Switching circuits have long been used in various mechanical and electromechanical forms to perform logical and control operations in such diverse areas as telephone switching systems and desk calculators. The recent widespread use of electronic data processing machines and related apparatus has made the systematic study of electronic switching or logic circuits a highly important area of scientific and engineering effort.

According to one classification, switching circuits are divided into two broad categories, combinational circuits and sequential circuits. Combinational circuits are those in which the output signals depend only upon the combination of input signals and not upon the past history or sequence of the input signals. Sequential circuits are those in which the output signals do depend upon the sequence of input signals. A sequential circuit, also referred to as a finite state machine, may be considered to be a combinational circuit with memory to record the circuit's past history. A more complete discussion of many of the aspects of combinational and sequential switching circuits can be found in any one of several well-known papers and books on switching circuits, such as, for example, Aufenkamp D. C. and Hohn, F. E., "Analysis of Sequential Machines," IRE Transactions on Electronic Computers, EC-6, PP. 276–285, Dec. 1957; Huffman, D. A., "The Synthesis of Sequential Switching Circuits," J. Franklin Institute, 257:161–190, March 1954; Phister, M., Jr., "Logical Design of Digital Computers," John Wiley & Sons, Inc., New York 1958; Marcus, M. P., "Switching Circuits for Engineers," Prentice-hall, Inc., New Jersey, 1967; Miller, R. E. "Switching Theory," Vol. I, Combinational Circuits (Vol. II Sequential Circuits), John Wiley & Sons, Inc., New York 1965; Humphrey W. S., "Switching Circuits," McGraw-Hill, New York, 1958; and Caldwell, S. H., "Switching Circuits and Logic Design," Wiley, New York 1958.

There have been developed a number of so-called canonical forms of finite state machines which behave and are realizable in accordance with particular algorithms or design procedures. Among these is the well-known Moore machine wherein the algorithm specifies that the present state be uniquely determined by the previous state and previous input, and the present output be uniquely determined by the present state. An extensive discussion of Moore machines can be found in "Gedanken-experiments on Sequential Machines," in Automata Studies, C. E. Shannon and J. McCarthy, Eds., Princeton University Press, Princeton, N.J., pp. 129–153, 1956.

Another well-known result in switching circuit theory is that any synchronous sequential machine can be realized with a Moore machine having, at most, one feedback loop. This result was disclosed in an article entitled "Feedback in Synchronous Sequential Switching Circuits," by A. D. Friedman, IEEE Transactions on Electronic Computers, Vol. EC-15, No. 3, pp. 154–367. For such a Friedman machine having $k$ delay circuits in each of the feedback and input paths, the present state of the machine is uniquely determined by knowledge of the values of input and feedback variables at the last $k$ units of time. Such a realization is said to have finite memory $K$ with respect to the feedback variable $f$ and the input variable $x$. Friedman's technique indicates how to find a feedback variable $f$ which, together with the input variable $x$, gives every event finite memory.

Recently developed manufacturing techniques make possible the economical simultaneous production of a large number of integrated circuit semiconductor devices. These so-called batch-fabrication techniques make possible the simultaneous manufacture of the many devices necessary to realize many complicated switching circuit arrangements. Further, these techniques allow the interconnection of the devices to be made at the time of manufacture; that is, no extensive hand or machine interconnection of the separate logic devices is required. It is most desirable in many cases that the individual device or small combination of devices be identical, thereby simplifying the manufacturing process. When this is possible, and the combinations of devices (cells) are arranged in regular arrays, the results are often referred to as microcellular arrays.

A recent state-of-the-art review of microcellular techniques may be found in "A Survey of Microcellular Research," by R. C. Minnick in Journal of the Association for Computing Machinery, Vol. 14, No. 2, Apr. 1967, pp. 203–241. Based on this state-of-the-art study, it is clear, as the author explicitly states, that there is a long-felt need for development in the area of multiple-function programmable arrays suitable for integrated circuit batch-fabrication techniques.

Additionally, various techniques have been suggested whereby a circuit for the generation of a given sequential function from a basic behavior flow table can be realized with identical-cell arrays. Classically, however, the interconnections among the constituent components are specific to the particular application and are invariably of a highly irregular nature.

SUMMARY OF THE INVENTION

Accordingly, an object of the present invention is to provide an improved sequential switching function generator.

More specifically, an object of the present invention is to provide a general-purpose circuit adaptable with slight modifications to produce any arbitrary sequential function.

A further object of this invention is to provide any adaptable circuit, the adaptations to which can be determined from a well-defined procedure performable manually or by computer techniques.

A still further object of the present invention is to provide a circuit susceptible to manufacture by integrated circuit batch-fabrication techniques.

Briefly stated, the present invention provides generalized circuitry for generating any one of an arbitrary number of sequential switching functions in response to adaptations made to the circuit at an easily accessible edge of a two-dimensional construction of the circuit.

The present invention provides for circuitry comprising a number of identical component cells, or modules, arranged in a fixed pattern, and having fixed interconnections. The circuit is adaptable, in a first typical embodiment to generate a desired function simply by applying a well-defined set of constant-valued input signals to the circuit. In a second typical embodiment, the adaptation is made by completing, or deleting, certain simple connections at the edges of the circuit.

The present invention thus avoids the difficulties of the prior art in that it avoids irregular, specialized interconnections in arrays of identical modules. The present invention also makes possible the construction of sequential switching circuits suitable for manufacture by integrated circuit batch-fabrication techniques. Further, these arrays are easily programmable to perform any sequential switching function.

It is accordingly a feature of the present invention that a circuit having a fixed configuration be adaptable to perform a number of functions.

It is another feature of the present invention that the circuit comprises a number of identical elements each of which comprises a memory facility.

It is a further feature of this invention that the circuit is programmable by applying well-defined external signals to elements at an edge of the physical realization of the circuit or, alternatively, by completing or deleting certain connections between selected elements near the edge of the circuit.

BRIEF DESCRIPTION OF THE DRAWINGS

The above-mentioned and other objects, features and advantages of the invention will be more clearly understood from the following detailed description of a number of illustrative embodiments when read in conjunction with the drawings, in which:

FIG. 6 shows a logic diagram of a six-input logic module;

FIG. 7 (FIGS. $7_1$ and $7_2$ taken together) shows a two-tree array used to realize a typical embodiment of the invention;

FIG. 9A (FIGS. $9A_1$ and $9A_2$ taken together) shows a circuit including a two-tree array which satisfies the behavior criteria of the flow tables and graph of FIGS. 8A, 8B, 8C, and 8D:

FIG. 9B is a reduced version of the array of FIG. 9A;

FIG. 11 shows a logic diagram of a half-adder circuit;

FIG. 12 illustrates the truth table for the half adder of FIG. 11;

FIG. 16 illustrates the manner in which two identical $2^N$ by $n+1$ rectangular arrays are cascaded to produce both a feedback function $f$ and an output function $z$;

FIGS. 17A, 17B, 17C, and 17D show the flow tables and implication graph of an illustrative example for a typical embodiment of the invention;

DETAILED DESCRIPTION

Initially, algorithms will be presented for realizing a given binary-input, binary-output, modified Moore machine in the form of a circuit having;

1. only one type of component machine, or module,
2. a highly regular interconnection pattern, and
3. at most a single binary feedback path.

For purposes of clarity, a synthesis technique applicable to a circuit associated with definite events only (that is, involving no feedback variables) will be described first. The more general method for regular events will then be discussed.

Figure 1A:
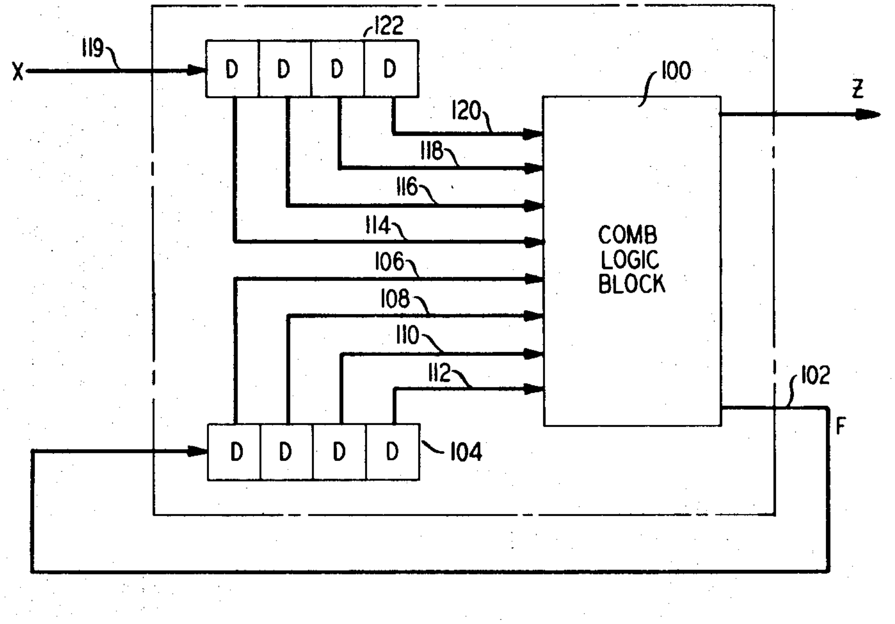
FIG. 1A (PRIOR ART)
FIG. 1A is a block diagram of the prior art single-feedback Moore sequential circuit.

It has been established that a Moore machine of the form shown in FIG. 1A is capable of generating any synchronous sequential function by means of a single feedback path. A combinational logic block 100 comprises an array of logic modules for producing an arbitrary combinational function. Lead 102 is arranged such that a feedback signal developed in combinational logic block 100 is applied to a shift register 104. Lead 106 is arranged to conduct the feedback signal incident on shift register 104 from a first stage of shift register 104 to combinational logic block 100. Similarly, leads 108, 110 and 112 conduct the feedback signal incident on shift register 104 from successive stages of shift register 104 to combinational logic block 100. In the same manner, leads 114, 116, 118, and 120 conduct the input signal from succeeding stages of a shift register 122 to which the input signal is applied directly by way of lead 119.

Figure 1B:
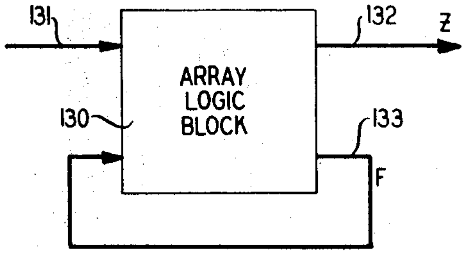
FIG. 1B shows a block diagram of the present invention.

The circuit of FIG. 1A is an illustration of the prior art. A block diagram of the circuit of the present invention is shown in FIG. 1B. As seen from FIG. 1B, the circuit comprises an array logic block 130, an input terminal 131, an output terminal 132 and a feedback path 133. (The number of feedback paths varies with the application as will be explained below.) Array logic block 130 of FIG. 1B comprises a fixed array of identical logic modules interconnected in a highly regular manner. Shift registers 104 and 122 of FIG. 1A are unnecessary in the circuit of FIG. 1B since each module of the array is equipped with a unit delay. Because of the uniform and fixed nature of the array, arrays of the present invention are uniquely suited to integrated circuit batch-fabrication manufacturing techniques.

Basically, two arrays have been incorporated in circuits to serve as illustrative embodiments of the present invention, a tree array and a four-neighbor rectangular array. The first of these to be discussed is the tree array embodiment.

Initially, however, it is considered desirable to discuss the type of component module useful in the tree array of the first embodiment.

Figure 2B:
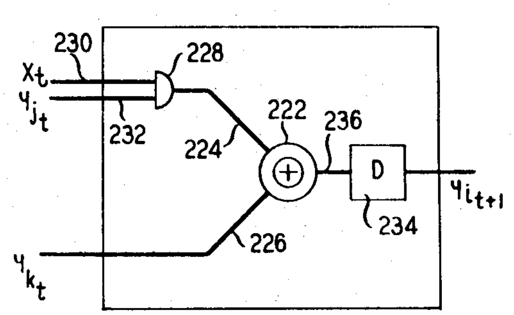
FIGS. 2A and 2B illustrate two component logic modules used in a typical embodiment of the invention.
Figure 2A:
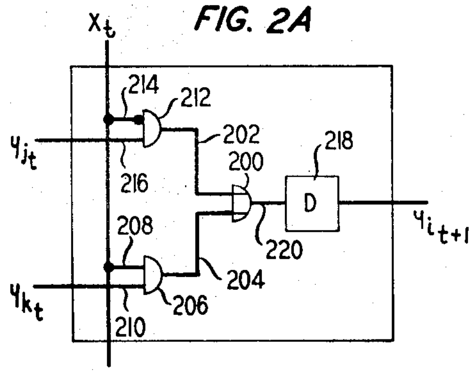

FIG. 2A shows an $i$th module $M_i$ including an OR circuit 200 arranged to logically OR input signals on leads 202 and 204. The OR circuit may be implemented using any standard device combinations. Also shown in FIG. 2A is an AND circuit 206 also of standard design arranged to logically AND input signals on leads 208 and 210. A second AND circuit 212, again of standard design, is arranged to logically AND the input on lead 216 and the inverse of the input on lead 214. The output signals from gates 212 and 206 appear on leads 202 and 204, respectively. A delay circuit 218 provides a unit delay for the signal on lead 220. Any standard delay device will perform this function.

FIG. 2B shows a second circuit suitable for use in appropriate cases as a three-input $i$th module $M_i$. A standard-design Exclusive OR circuit 222 is arranged to perform the logical Exclusive OR operation on the signals on leads 224 and 226. A standard-design AND circuit 228 is arranged to logically AND input signals on leads 230 and 232. A standard design unit delay circuit 234 provides a time delay for the input on lead 236.

In the discussion relative to the synthesis technique for definite events, the module of FIG. 2A will be assumed to be the component module.

Because of the inherent delay in each module, module $M_i$ is characterized by the input-output relation $$y_{i_{t+1}} = y_{j_t} \cdot \bar{x}_t + y_{k_t} \cdot x_t \qquad (1)$$

where $y_{j_t}$ and $y_{k_t}$ are either the output signals from other modules or fixed logical constants, depending on the position of the module in the overall machine. $x_t$ is an input variable and $y_{i_{t+1}}$ is the output of $M_i$ for all $t=0, 1, \ldots$ In all cases, $t$ is the time variable.

Figures 3, 4A, 4B:
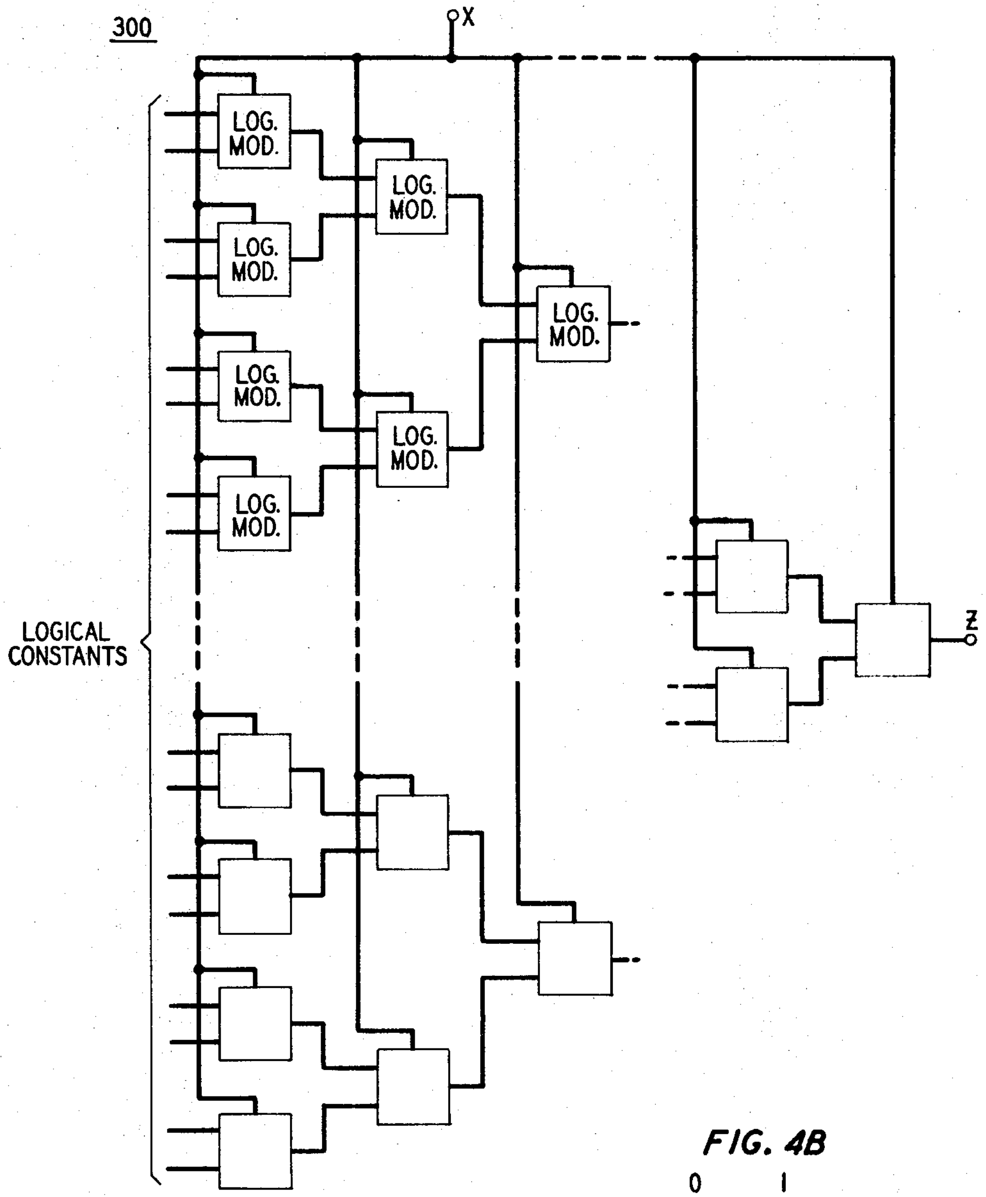
FIG. 3 illustrates a tree array to be utilized in a first typical embodiment of the invention.
FIGS. 4A and 4B illustrate typical flow tables which describe the behavior of a function for which a circuit of a typical embodiment is realized.

In a first typical embodiment of the present invention, illustrated in general form in FIG. 3 (for the case of definite events), the modules are interconnected in the form of a tree structure 300 with a highly regular interconnection pattern. The modules are all identical and are of the form shown in FIG. 2A, as indicated above. The input signals to the modules of the extreme left-hand column of tree 300 are all signals representing logical constants which are derived from a flow table associated with the logic function being generated. The input variable $x$ serves as an input to each module of array 300.

In accordance with one embodiment of the present invention, a switching circuit for a definite event can be synthesized from the following basic algorithm:

1. Derive an "information" flow table from a basic flow table description of a desired definite event.

2. Based on the information flow table, determine the input-output relation for each module.

These steps are best described by means of an example.

FIG. 4A shows a typical flow table description of a desired switching function. Suppose it is desired to realize a circuit corresponding to this definite basic flow table in the form of a tree configuration similar to array 300 of FIG. 3. The basic flow table of FIG. 4A completely defines the behavior of the system to be synthesized.

Typically, the top line within the box of basic flow table FIG. 4A is read as follows:

When the circuit is in the present state 1 (as indicated by the left-hand column) and the input $x$ is 0, the output $z$ is 0 and the next state of the circuit is 2. Similarly, the second line is read as follows:

When the system is in state 2 and the input $x$ is 1, the output $z$ is 0 and the next state is 1. The remaining rows are similarly interpreted in a now obvious manner.

The first step in synthesizing the desired circuit is to derive the information flow table. For the present typical example, the appropriate information flow table is shown in FIG. 4B. This information flow table has been derived by first considering the total subset [1, 2, 3, 4, 5]. From the table in FIG. 4A, an input of $x$=0 is seen to map this set into the subset [2, 3, 4], while an input of $x$=1 maps the total subset into [1, 5]. Thus, block 1 of the information flow table contains the entries 234 and 15, indicating the so-called length 1 input mappings (FIG. 4B). Similarly, block 2 in FIG. 4B shows the subsets onto which [1, 2, 3, 4, 5] is mapped by input signals of length 2. This process is continued until, in block 4, all of the "mapped into" subsets consist of single states. The process of mapping will result in a collection of unique "mapped-into" states if, and only if, the flow table is definite. Generation of the information flow table completes the first phase of the algorithm.

The second phase of the algorithm is now initiated. It is noted from the basic flow table, shown in FIG. 4A, that the output of the circuit is a logical 1, if and only if, the circuit is in one of the states 3, 4, or 5. Block 4 of the information flow table (FIG. 4B) indicates that the machine is in states 3, 4, or 5 when 1. the machine was previously in one of the subsets [2], [4], or [3] and the last input was $x$=0, or 2. the machine was previously in state 4 and the last input was $x$=1.

This corresponds to an output at time t+1 given by $$z_{t+1}=(S_2+S_3+S_4)_t\cdot\bar{x}_t+(S_4)_t\cdot x_t \qquad (2)$$

where $S_p$ is a binary signal corresponding to state $p$, for $p$=1, 2, ...; that is, $S_p$=1 when the machine is in state $p$ and $S_p$=0 when the machine is not in state $p$. For the case where S has multiple subscripts, S takes on a similar value of the signal representative of the logical union of the sets corresponding to the subscripts. For example, if the signal is $S_{34}$, $S_{34}$=1 when the machine is in either of the states 3 or 4 and $S_{34}$=0 when the machine is not in either of the states 3 or 4. $S_\Phi$, the null set, is the signal representative of the condition wherein the machine is not in any of the states specified for it. $S_\Phi$ is therefore always a logical 0. In each case, the subscript indicates the point in time at which the associated quantity is to be evaluated, "+" indicates a logical OR (union) and "·" indicates a logical AND (intersection). Block 3 of the information table of FIG. 4B then shows that $$(S_2+S_3+S_4)_{t+1}=(S_{34}+S_{15}+S_2+S_1)_t\cdot\bar{x}_t+(S_\Phi)_t\cdot x_t \qquad (3a)$$

$$(S_4)_{t+1}=(S_{34})_t\cdot\bar{x}_t+(S_\Phi)_t\cdot x_t(S\cdot x_t(S_\Phi=0) \qquad (3b)$$

Block 2 then gives $$(S_{34}+S_{15}+S_2+S_1)_{t+1}=(S_{234}+S_{15})_t\cdot\bar{x}_t+(S_{234}+S_{15})\cdot x_t \qquad (4a)$$

$$(S_{34})_{t+1}=(S_{234})_t\cdot x_t+(S_\Phi)_t\cdot x_t \qquad (4b)$$

Finally, block 1 gives $$(S_{234}+S_{15})_{t+1}=S_I\cdot\bar{x}_t+S_I\cdot x_t(S_I=S_{12345}=1) \qquad (5b)$$

$$(S_{234})_{t+1}=S_I\cdot\bar{x}_t+(S_\Phi)_t\cdot X_t \qquad (5b)$$

Figure 5A:
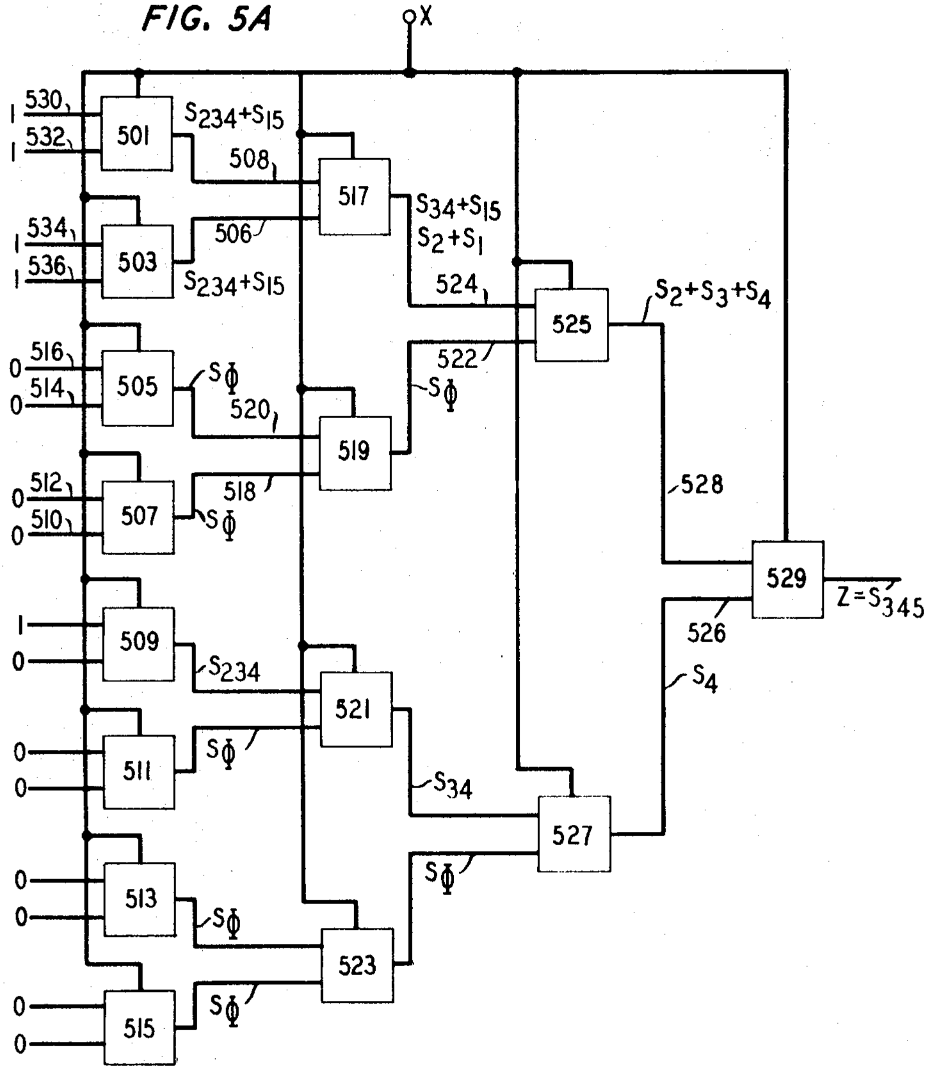
FIG. 5A shows a tree array realization of the circuit specified by the flow tables of FIGS. 4A and 4B.

Thus, a system of equations corresponding to a circuit for realizing $Z$ has been derived from the original definite basic flow table. The circuit can then be constructed from these equations, as shown in FIG. 5A, or, if desired, as in FIG. 5B.

In each case, all the modules are identical to that shown in FIG. 2A. FIG. 5A shows a module 529 for which the input leads 528 and 526 are connected to modules 525 and 527, respectively. Equation (1) specifies the input signals on each lead 528 and 526 of module 529. Thus, the logical union of the signals representative of the states 2, 3, and 4 is incident on module 529 by means of lead 528. Lead 528 corresponds to lead 216 of FIG. 2A. Thus, the signal on lead 528 is logically combined with $\bar{x}_t$ in an AND circuit. Lead 526 conducts the signal representative of state 4 to module 529 to be logically combined with $x_t$ in an AND circuit. Similarly, equation (3$a$) indicates the signals which must be applied to module 525 at a given instant of time required to produce the desired signal on lead 528 at the next instant of time. Thus, $S_{34}+S_{15}+S_2+S_1$ must be applied to lead 524 to be logically combined with input $\bar{x}_t$ in an AND circuit and $S_\Phi$, or the signal representative of the empty set, must be applied to lead 522 to be logically combined with input $x_t$ in the appropriate AND circuit.

Continuing the synthesis, it is clear that the only signals required to produce signals representative of the empty set are other signals representative of the empty set. Leads 518 and 520, input leads to module 519, must necessarily conduct empty set signals as must leads 516, 514, 512, and 510, input leads to modules 505 and 507 also required to produce only empty set signals.

Equation (4$a$) indicates the signals required at the input of module 517 to produce the desired signal on lead 524. These signals, corresponding to the right-hand side of equation (4$a$), appear on leads 508 and 506. These signals are, in turn, generated by modules 501 and 503. That is, equation (5$a$) indicates that the output from module 501, the signal on lead 508, is generated when both input signals to module 501 are logical 1's. FIG. 5A shows such input signals to leads 530 and 532; and, since the signal on lead 506 is identical to that on lead 508, equation (5$a$) applies to module 503 also. Logical 1's are thus applied to leads 534 and 536 of module 503. That portion of the tree comprising modules 509, 511, 513, 515, 521, 523, and 527 are similarly arranged according to the relationship dictated by equations (3$b$), (4$b$), and (5$b$).

Figure 5B:
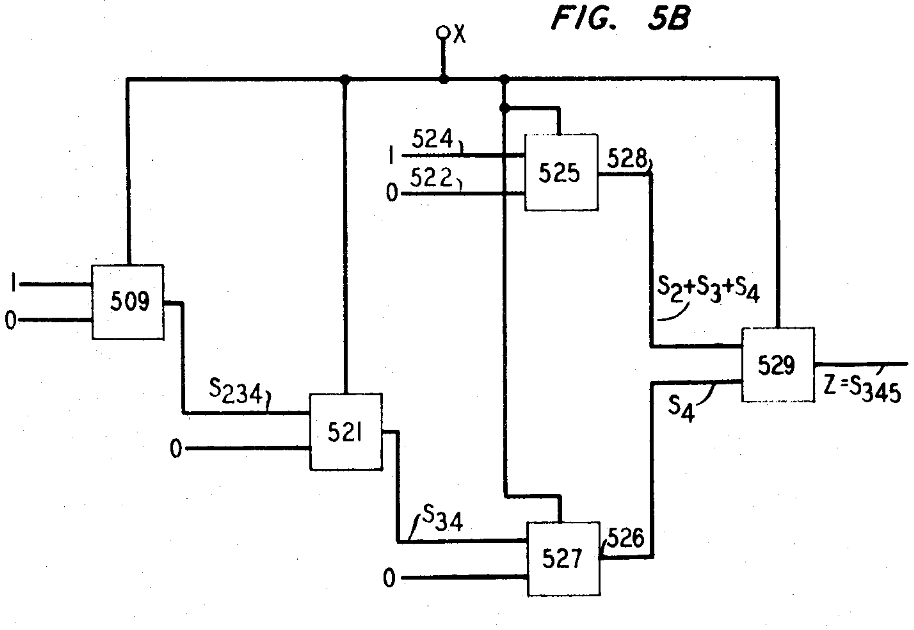
FIG. 5B illustrates a reduced form of the tree array of FIG. 5A.

The circuit of FIG. 5B is derived by removing those modules of FIG. 5A which produce constant outputs, i.e., by simplifying the array of FIG. 5A. In particular, modules 505, 507, and 519 have been removed because each generates a signal corresponding to a logical 0 at all times. A constant-valued input signal of logical 0 may therefore be applied directly to lead 522. For the same reason, module 511 has been deleted and a constant zero-valued signal applied directly to module 521. Also, modules 513, 515, and 523 have been replaced by a constant-valued zero signal applied to module 527. The signal on lead 524 ($S_{34}+S_{15}+S_2+S_1$) is a signal representative of the so-called identity subset and is, by definition, a logical 1.

Although the circuit shown in FIG. 5B possesses certain obvious advantages associated with reduced component count, the arrangement of FIG. 5A possesses the sought-after uniformity so important in batch-fabrication manufacturing techniques. In particular, a standard array structure can easily be constructed with cell internal interconnections permanently made, as shown in FIG. 5A. To adapt this standard circuit to perform the desired switching operation, it is only necessary to apply the constant-valued signals shown at the left of FIG. 5A; for a different desired function, a corresponding different set of constant-valued signals is derived in the manner illustrated above and applied to the left edge of the circuit of FIG. 5A.

The general algorithm for regular events (those corresponding to a situation involving feedback variables) will now be considered. The circuit for realizing regular events will, in accordance with one embodiment of the present invention, utilize a six-input module $M_t$, as shown in FIG. 6. FIG. 6 shows an OR-gate 600 arranged to logically OR the output signals from an AND-gate 602, an AND-gate 604, an AND-gate 606, and an AND-gate 608. The three-input AND gates and the four-input OR gates are of standard design. The output from OR-gate 600 is connected to the input of a standard design delay circuit 610. A number of these modules are interconnected in the two generalized tree structures of FIG. 7 (FIGS. $7_1$ and $7_2$ taken together form FIG. 7), each of which has a perfectly regular interconnection pattern. The first of these tree structures is designated by the identification numeral 710, and the second is designated 720. Both tree structure 710 and tree structure 720 comprise a number of modules of the form shown in FIG. 6, the size of the tree structures 710 and 720 being determined by the function to be generated. The input-output relation for the *i*th module is $$y_{i_{t+1}}=y_{j_t}\cdot\bar{x}_t\cdot\bar{f}_t+y_{k_t}\cdot\bar{x}_t\cdot f_t+y_{l_t}\cdot x_t\cdot f_t+y_{m_t}\cdot x_t\cdot\bar{f}_t \qquad (6)$$

where each of the variables $y_{j_t}$, $y_{k_t}$, $y_{l_t}$, and $y_{m_t}$ are the outputs of other modules (*j*, *k*, *l*, *m*) or logical constants. Tree structure 710 is used to form a single feedback function *f*, while tree structure 720 is used to form the output function *z*.

The switching circuit for a regular event can now be synthesized in accordance with one embodiment of the present invention by utilizing the following basic algorithm:

1. Using Friedman's techniques, determine a feedback function, *f*, such that a given basic flow table has finite memory with respect to *x* and *f*.

2. Once the feedback function has been obtained, derive the information flow table with respect to *x* and *f*.

3. Based on the information flow table, determine the input-output relation for each module of the two-tree structure.

The application of this algorithm will be illustrated by means of an example.

Figures 8A, 8B, 8C, 8D:
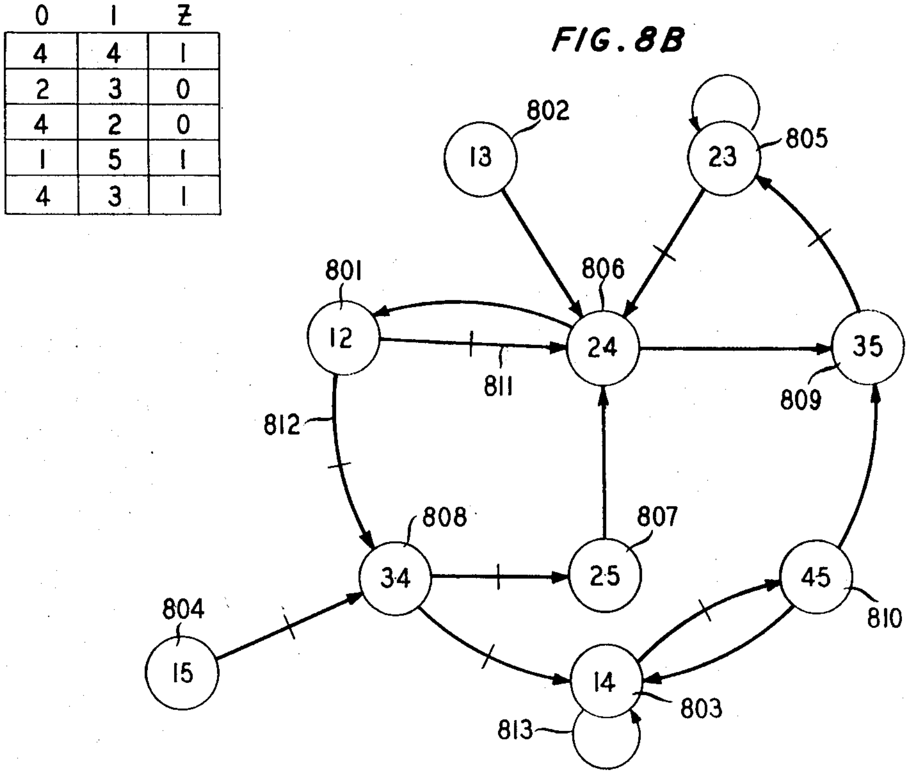
FIGS. 8A, 8B, 8C, and 8D show flow tables which describe the behavior of a circuit of a typical embodiment and an implication graph which specifies a feedback function for that circuit.

Suppose it is desired to realize the flow table of FIG. 8A in the form of the two-tree structure of FIG. 7. The method for determining a single feedback function which gives the machine finite memory is fully described in the above-mentioned paper by A. D. Friedman at page 356 et seq. Briefly, it is found by first deriving an implication graph from the basic flow table. As formulated by Friedman, an implication graph of a flow table for a function F(G,I) described by the flow table is composed of:

1. a node for each pair of distinct states, *i* and *j*, shown on the flow table, (including only those pairs which have successors), and 2. a directed arc labeled $I_a$ from node *ij* to node *pr* when N(*m*, $I_k$) and f(*m*, $I_k$) are defined as the next state of the flow table and the value of the function *f*, respectively, when the present state is *m* and the input is $I_k$, and, if N(*i*, $I_a$)=*p* and N(*j*, $I_a$)=*r* and f(*i*, $I_a$) and *f*(*j*, $I_a$) are not differently specified, and similarly, if N(*i*, $I_a$)=*r*, and N(*j*, $I_a$)=*p*.

The implication graph for the flow table of the example is shown in FIG. 8B. Each of the nodes 801–810 represents a pair of distinct states. For example, node 801 represents the pair [1, 2]. From the first two lines of the flow table of FIG. 8A, it is seen that the next pair of states when the present state is one of the pair [1, 2] is one of the pair [2, 4] when *x*=0 and one of the pair [3, 4] when *x*=1. An arc 811 on FIG. 8B indicates the transition from the node 801 to the node 806, representing the transition from state pair [1, 2] to the state pair [2, 4]. Similarly, an arc 812 indicates the transition from node 801 to node 808 representing the transition from state pair [1, 2] to state pair [3, 4]. The remaining nodes and arcs are derived in the same manner. An arc such as arc 813 is generated when a present pair of states is identical to the next pair of states, as, for example, state pair [1, 4] of the flow table of FIG. 8A is succeeded by state pair [4, 1] when *x*=0.

A feedback function *f* which effects the breaking of all the loops in the so-called pair-wise implication graph of FIG. 8B is obtained according to Friedman's method and is indicated in the table of FIG. 8C.

The information flow table can then be generated in the usual way and is shown in FIG. 8D. In the generalized case, block number *k* shows all the subsets of states into which the set, including all states, can be mapped by an input-feedback sequence of length *k*. The table is developed until all subsets contain at most one state. If the feedback function was chosen correctly, the information flow table must be finite. The length of the table, however, depends on the length of the longest unbroken path in the implication graph. Since the size of the final circuit is a strong function of the length of the information flow table, the feedback function should be chosen carefully.

It is now possible to derive the system of equations for realizing the flow table in the two-tree form of FIG. 7.

There are a number of "don't care" entries in the information flow table. The method by which these entries are handled does not effect the basic size of the two-tree structure. However, if only those modules which do not produce constant outputs are to be used, the number of such modules needed can be minimized by proper handling of the "don't care" entries, described below.

The basic flow table in FIG. 8C specifies that *f*=1 when the machine is in one of the states in the subset [2, 4, 5]. Block 3 of the information flow table indicates that the machine is presently in states 2, 4, or 5 when:

1. the machine was previously in one of the subsets [1], [1, 2], [3, 5], [3 ] and the last input and feedback values were *x*=*f*=0, or 2. the machine was previously in one of the subsets [5], [1, 2], [3, 5], [2] and the last input and feedback values were *x*=0, *f*=1, or 3. the machine was previously in the subset [4] and the last input and feedback values were *x*=*f*=1, or 4. the machine was previously in one of the subsets [1], [1, 2], [3, 5], [3 and the last input and feedback values were *x*=1, *f*=0.

This corresponds to $$f_{t+1}=(S_1+S_{12}+S_{35}+S_3)_t\cdot\bar{x}_t\cdot\bar{f}_t+(S_5+S_{12}+S_{35}+S_2)_t\cdot\bar{x}_t\cdot f_t+(S_4)_t\cdot x_t\cdot f_t+(S_1+S_{12}+S_{35}+S_3)_t\cdot x_t\cdot\bar{f}_t \qquad (7)$$

However, additional terms can optionally be incorporated to take into account the "don't care" entries. If these terms are included but marked with a * so that they can be identified, the expression becomes $$f_{t+1}=[S_1+S_{12}+S_{35}+S_3+S_5{}^*+S_4{}^*+S_2{}^*]_t\cdot\bar{x}_t\cdot\bar{f}_t+[S_5+S_{12}+S_{35}+S_2+S_l{}^*+S_3{}^*]_t\cdot\bar{x}_t\cdot f_t+[S_4+S_1{}^*+S_3{}^*]_t\cdot x_t\cdot f_t+[S_1+S_{12}+S_{35}+S_3+S_5{}^*+S_4{}^*+S_2{}^*]_t\cdot x_t\cdot\bar{f}_t \qquad (8)$$

Note that in block 3, the machine must have previously been in one of the state subsets [1], [1, 2], [3, 5], [5], [4], [3], or [2], which includes all of the states of the machine. Therefore $(S_1+S_{12}+S_{35}+S_5+S_4+S_3+S_2)_t\equiv1$. Since the input signals corresponding to $\bar{x}_t\cdot f_t$ and $x_t\cdot f_t$ cannot be identically 0 for all *t*, nothing can be lost by choosing the terms associated with $\bar{x}_t\cdot\bar{f}_t$ and $x_t\cdot\bar{f}_t$ to be $S_I\equiv1$. We, therefore, get $$f_{t+1}=S_I\cdot\bar{x}_t\cdot\bar{f}_t+[S_5+S_{12}+S_{35}+S_2+S^*{}_1+S_3{}^*]_t\cdot\bar{x}_t\cdot f_t+[S_4+S^*{}_1+S_3{}^*]_t\cdot x_t\cdot f_t+S_I\cdot x_t\cdot\bar{f}_t \qquad (9)$$

Block 2 of the information flow graph then gives the following equations $$[S_5+S_{12}+S_{35}+S_2+S^*{}_1+S_3{}^*]_{t+1}=[S^*{}_4+S_{24}{}^*]_t\cdot\bar{x}_t\cdot\bar{f}_t+[S_{124}+S_{24}+S_4{}^{}]_t\cdot\bar{x}_t\cdot f_t+[S_4+S_{124}+S_{24}+S_{35}{}^{}]_t\cdot x_t\cdot f_t+[S_{35}+S^*{}_4+S_{24}{}^*]_t\cdot x_t\cdot\bar{f}_t \qquad (10)$$

$$[S_4+S^*{}_1+S_3{}^*]_{t+1}=[S_{124}+S_{35}+S^*{}_4+S_{24}{}^*]_t\cdot\bar{x}_t\cdot\bar{f}_t+[S_{35}+S_4{}^{}]_t\cdot\bar{x}_t\cdot f_t+[S_{35}{}^{}]_t\cdot x_t\cdot f_t+[S_{124}+S^*{}_4+S_{24}{}^*]_t\cdot x_t\cdot f_t \qquad (11)$$

Where the items marked with a * are optional due to "don't care" entries in block 2, and the items marked with  are due to "don't care" entries in block 3**. For these two equations, there are again input signals which cannot be logical constants, so nothing can be lost by taking all logical constants possible. This results in $$[S_5+S_{12}+S_{35}+S_2+S_1+S_3{}^*]_{t+1}=S_\Phi\cdot\bar{X}_t\cdot\bar{f}_t+[S_{124}+S_{24}+S_4{}^{**}]_t\cdot\bar{x}_t\cdot f_t+S_I\cdot x_t\cdot f_t+[S_{35}+S^*{}_4+S_{24}{}^*]_t\cdot x_t\cdot\bar{f}_t \qquad (12)$$

and $$[S_4+S^*{}_1+S_3{}^*]_{t+1}=S_I\cdot\bar{x}_t\cdot\bar{f}_t+[S_{35}+S_4{}^{**}]_t\cdot\bar{x}_t\cdot f_t+S_\Phi\cdot x_t\cdot f_t$$

$$+[S_{124}+S^*{}_4+S_{24}{}^*]_t\cdot x_t\cdot \bar{f}_t. \qquad (13)$$

Similarly, block 1 then implies that $$[S_{35}+S^*{}_4+S_{24}{}^*]_{t+1}=S^{}{}_I\cdot\bar{x}_t\cdot\bar{f}_t+S_\Phi\cdot\bar{x}_t\cdot f_t+S_I\cdot x_t\cdot f_t+S^{}{}_I\cdot x_t\cdot\bar{f}_t, \qquad (14)$$

$$[S_{124}+S^*{}_4+S_{24}{}^*]_{t+1}=S^{}{}_I\cdot\bar{x}_t\cdot\bar{f}_t+S_I\cdot\bar{x}_t\cdot f_t+S_\Phi\cdot x_t\cdot f_t+S^{}{}_I\cdot x_t\cdot\bar{f}_t, \qquad (15)$$

$$[S_{124}+S_{24}+S_4{}^{}]_{t+1}=S^{}{}_I\cdot\bar{x}_t\cdot\bar{f}_t+S_I\cdot\bar{x}_t\cdot f_t+S_\Phi\cdot x_t\cdot f_t+S_I\cdot x_t\cdot\bar{f}_t \qquad (15a)$$

and $$[S_{35}+S_4{}^{}]_{t+1}=S^{}{}_I\cdot\bar{x}_t\cdot\bar{f}_t+S_\Phi\cdot\bar{x}_t\cdot f_t+S_I\cdot x_t\cdot f_t+S_\Phi\cdot x_t\cdot\bar{f}_t. \qquad (15b)$$

$S^{}{}_I$ is due to "don't care" entries in block 2**. In no case can it be chosen to be 0 or 1 to any advantage with respect to the other.

Therefore, taking $S^{**}{}_I=0$, equation (14) becomes $$[S_{35}+S^*{}_4+S_{24}{}^{**}]_{t+1}=S_\Phi\cdot\bar{x}_t\cdot\bar{f}_t+S_\Phi\cdot\bar{x}_t\cdot f_t+S_I\cdot x_t\cdot f_t+S_\Phi\cdot x_t\cdot\bar{f}_t, \qquad (16)$$

and equation (15) becomes $$[S_{124}+S^*{}_4+S_{24}{}^*]_{t+1}=S_\Phi\cdot\bar{x}_t\cdot\bar{f}_t+S_I\cdot\bar{x}_t\cdot f_t+S_\Phi\cdot x_t\cdot f_t+S_\Phi\cdot x_t\cdot\bar{f}_t. \qquad (17)$$

Similarly, equation (15*a*) becomes $$[S_{124}+S_{24}+S_4{}^{**}]_{t+1}=S_\Phi\cdot\bar{x}_t\cdot\bar{f}_t+S_I\cdot\bar{x}_t\cdot f_t+S_\Phi\cdot x_t\cdot f_t+S_I\cdot x_t\cdot\bar{f}_t \qquad (17a)$$

and equation (15*b*) becomes $$[S_{35}+S_4{}^{**}]_{t+1}=S_\Phi\cdot\bar{x}_t\cdot\bar{f}_t+S_\Phi\cdot\bar{x}_t\cdot f_t+S_I\cdot x_t\cdot f_t+S_\Phi\cdot x_t\cdot f_t. \qquad (17b)$$

The circuit corresponding to the above equations for generating the feedback function $S_{t+1}$ is that portion of the two-tree structure of FIG. 9A located above the dashed line. FOr convenience, this portion of the tree is indicated by the identifying numeral 900.

To obtain the equations for the tree for generating the output function $z$, we note that $z=1$ when the machine is in one of the states of the set [1, 4, 5]. Block 3 then gives $$z_{t+}=[S_1+S_{12}+S_{35}+S_3+S^*{}_5+S^*{}_4+S_2{}^*]_t\cdot\bar{x}_t\cdot f_t+[S_5+S_4+S_{35}+S^*{}_1+S_3{}^*]_t\cdot\bar{x}_t\cdot f_t+[S_4+S_1+S_3{}^*]_t\cdot x_t\cdot f_t+[S_1+S_{12}+S^*{}_5+S^*{}_4+S_2{}^*]_t\cdot x_t\cdot\bar{f}_t \qquad (18)$$

in which the first bracketed term to the right of the equal sign will be taken as $S_I=1$, thus yielding $$z_{t+1}=S_I\cdot\bar{x}_t\cdot\bar{f}_t+[S_5+S_4+S_{35}+S^*{}_1+S_3{}^*]_t\cdot\bar{x}_t\cdot f_t+[S_4+S^*{}_1+S_3{}^*]_t\cdot x_t\cdot f_t+[S_1+S_{12}+S^*{}_5+S_2{}^*]_t\cdot x_t\cdot\bar{f}_t \qquad (19)$$

Block 2 then gives $$[S_5+S_4+S_{35}+S^*{}_1+S_3{}^*]_{t+1}=[S_{124}+S_{35}+S^*{}_4+S_{24}{}^*]_t\cdot\bar{x}_t\cdot\bar{f}_t+[S_{35}+S_4{}^{}]_t\cdot\bar{x}_t\cdot f_t+[S_4+S_{124}+S_{24}+S_{35}{}^{}]_t\cdot x_t\cdot f_t+[S_{124}+S^*{}_4+S_{24}{}^*]_t\cdot x_t\cdot\bar{f}_t, \qquad (20)$$

in which the first and third bracketed terms will be taken as $S_I=1$.

Then, $$[S_5+S_4+S_{35}+S^*{}_1+S_3{}^*]_{t+1}=S_I\cdot\bar{x}_t\cdot\bar{f}_t+[S_{35}+S_4{}^{**}]_t\cdot\bar{x}_t\cdot f_t+S_I\cdot x_t\cdot f_t+[S_{124}+S^*{}_4+S_{24}{}^*]_t\cdot x_t\cdot\bar{f}_t \qquad (21)$$

ALSO, $$[S_4+S^*{}_1+S_3{}^*]_{t+1}=[S_{124}+S_{35}+S^*{}_4+S_{24}{}^*]_t\cdot\bar{x}_t\cdot\bar{f}_t+[S_{35}+S_4{}^{}]_t\cdot\bar{x}_t\cdot f_t+[S_{35}{}^{}]_t\cdot x_t\cdot f_t+[S_{124}+S^*{}_4+S_{24}{}^*]_t\cdot x_t\cdot\bar{f}_t. \qquad (22)$$

If the first bracketed term is taken to be $S_I=1$, and the third bracketed term to be $S_\Phi=0$, it is seen that $$[S_4+S^*{}_1+S_3{}^*]_{t+1}=S_I\cdot\bar{x}_t\cdot\bar{f}_t+[S_{35}+S_4{}^{**}]_t\cdot\bar{x}_t\cdot f_t+S_\Phi\cdot x_t\cdot f_t+[S_{124}+S^*{}_4+S_{24}{}^*]_t\cdot x_t\cdot\bar{f}_t. \qquad (23)$$

Similarly, $$[S_1+S_{12}+S^*{}_5+S^*{}_4+S_2{}^*]_{t+1}=[S^*{}_4+S^*{}_{24}+S^{}{}_{124}+S_{35}{}^{}]_t\cdot\bar{x}_t\cdot\bar{f}_t+[S_4+S_{124}+S_{24}+S_{35}{}^{}]_t\cdot\bar{x}_t\cdot f_t+[S_4{}^{}]_t\cdot x_t\cdot f+[S^*{}_4+S^*{}_{24}+S^{}{}_{124}+S_{35}{}^{}]_t\cdot x_t\cdot\bar{f}_t \qquad (24)$$

gives the following relation $$[S_1+S_{12}+S^*{}_5+S^*{}_4+S_2{}^*]_{t+1}=S_\Phi\cdot\bar{x}_t\cdot\bar{f}_t+S_I\cdot\bar{x}_t\cdot f_t+S_\Phi\cdot x_t\cdot f_t+S_\Phi\cdot x_t\cdot\bar{f}_t \qquad (25)$$

when the four bracketed terms are replaced by $S_\Phi$, $S_I$, $S_\Phi$ and $S_\Phi$, respectively. Finally, block 1 gives $$[S_{124}+S^*{}_4+S_{24}{}^*]_{t+1}=S^{}{}_I\cdot\bar{x}_t\cdot\bar{f}_t+S_I\cdot\bar{x}_t\cdot f_t+S_\Phi\cdot x_t\cdot f_t+S^{}{}_I\cdot x_t\cdot\bar{f}_t, \qquad (26)$$

and $$[S_{35}+S_4{}^{}]_{t+1}=S^{}{}_I\cdot\bar{x}_t\cdot\bar{f}_t+S_\Phi\cdot\bar{x}_t\cdot f_t+S_I\cdot x_t\cdot f_t+S_\Phi\cdot x_t\cdot\bar{f}_t \qquad (26a)$$

where $S^{}{}_I$ is taken as $S_\Phi=0$. These equations are then used to realize the output trees of FIGS. 9A, 9B, and 10**, as will be indicated.

Equation (8) above indicates that $f_{t+1}$ for the flow table of FIG. 8C will be developed by a module of the form shown in FIG. 6, if the input signals to the module satisfy the right-hand side of that equation. Consequently, FIG. 9A$_1$ shows $f_{t+1}$ or $S_{245}$ on lead 901, the output lead of a module 902. The input signals to module 902, as specified by equation (9) are $S_I$ on lead 903, $S_5+S_{12}+S_{35}+S_2+S_1{}^*+S_3{}^*+$ on lead 904, $S_4+S_1{}^*+S_3{}^*$ on lead 905 and $S_I$ on lead 906. The input on lead 903 is applied to an AND gate within module 903 which performs the logical AND function on the input signals $S_I$, $\bar{x}$ and $\bar{f}$. Each of the remaining state signals is applied to the appropriate AND gate for logical combination with the $x$ and $f$ input signals.

Clearly, the only input signals to a module required to produce $S_I$ are logical 1's since $S_I$ is, by definition, logical 1. A module 907 in FIG. 9A$_1$ is shown to produce the signal $S_I$ on lead 903 from four input signals of the value logical 1. Similarly, each of the input signals, $S_I$, to module 907 is developed by input signals of the constant value 1. Thus, each of the modules 911, 912, 913, and 914 are arranged such that their input signals are logical 1's only.

In order to produce the signal required on lead 904, the input signals to a module must correspond to the terms of the right-hand side of equation (10). The first term immediately to the right of the equal sign of equation (10) includes only "-don't care" signals. Since the term containing only "don't care" signals may be any value whatever, it may be freely assigned any arbitrary value. For convenience, it will be assigned the value corresponding to the null set $S_\Phi$ which is equal to a logical 0.

Equation (10) then degenerates to equation (12) when it is noted that the third term of equation (10) represents all states of the machine and may therefore be replaced in equation (10) by the identity set, $S_I$.

Modules 915, 916, 917, and 918 operate on constant-valued input signals to produce the required input signals to module 908. The input signals required to produce $S_\Phi$ are again logical 0's only and the input signals required to produce $S_I$ are logical 1's only.

The constant-valued input signals required by modules 916 to produce the second term to the right of the equal sign of equation (12) are given by equation (17*a*). Similarly, the constant-valued input signals required by modules 918 to produce the fourth term to the right of the equal sign of equation (12) are given by equation (16). The remainder of the tree 900 comprising modules 909, 910, and 919 through 926 inclusive, is developed in the same way as the modules described above by direct application of equations (13), (15*b*) and (17) and the above-mentioned equivalents $S_\Phi$ and $S_I$.

The second section of the two-tree structure shown in FIG. 9A$_2$, located below the dashed line, is denoted by the identifying numeral 930. As tree 900 was arranged to produce the feedback variable, tree 930 is arranged to produce the output variable. Reference to equation (19) then indicates the input-output information applicable to modules 931 of FIG.9A$_2$.

The input-output conditions for modules 932 are specified by equation (21) a reduced form of equation (20).

The required constant-valued input signals to the modules 933 and 935, are, for the same reasons mentioned in the preceding examples, all logical 1's to produce the desired output signal $S_I$.

The input-output relationship for module 934 is given by equation (17*b*) and the input-output relationship for module 936 is given by equation (26). The remainder of tree 930 comprising modules 937 through 950, inclusive, is derived in a similar manner, by reference to equations (23), (25), and (26).

With reference to tree 900 and tree 930 of FIG. 9A, if each of the modules which produces a constant-valued signal only is replaced by a lead from an external source of that constant-valued signal, the trees of FIG. 9A can be reduced to the trees of FIG. 9B. Thus, modules 907, 911, 912, 913, and 914 have been replaced by lead 903 supplied directly from a source of signals representing a logical 1. Similarly, module 915 has been deleted and a logical 0 applied directly to lead 960 of module 908 in lieu thereof. Module 917 has been deleted and a logical 1 applied directly to lead 962 of module 908 in its place. Following this procedure for all modules having either all logical 1's or all logical 0's as input signals, tree 900 and tree 930 can be reduced to the minimum number of modules necessary to produce the feedback and output variables, as indicated in FIG. 9B.

Figure 10:
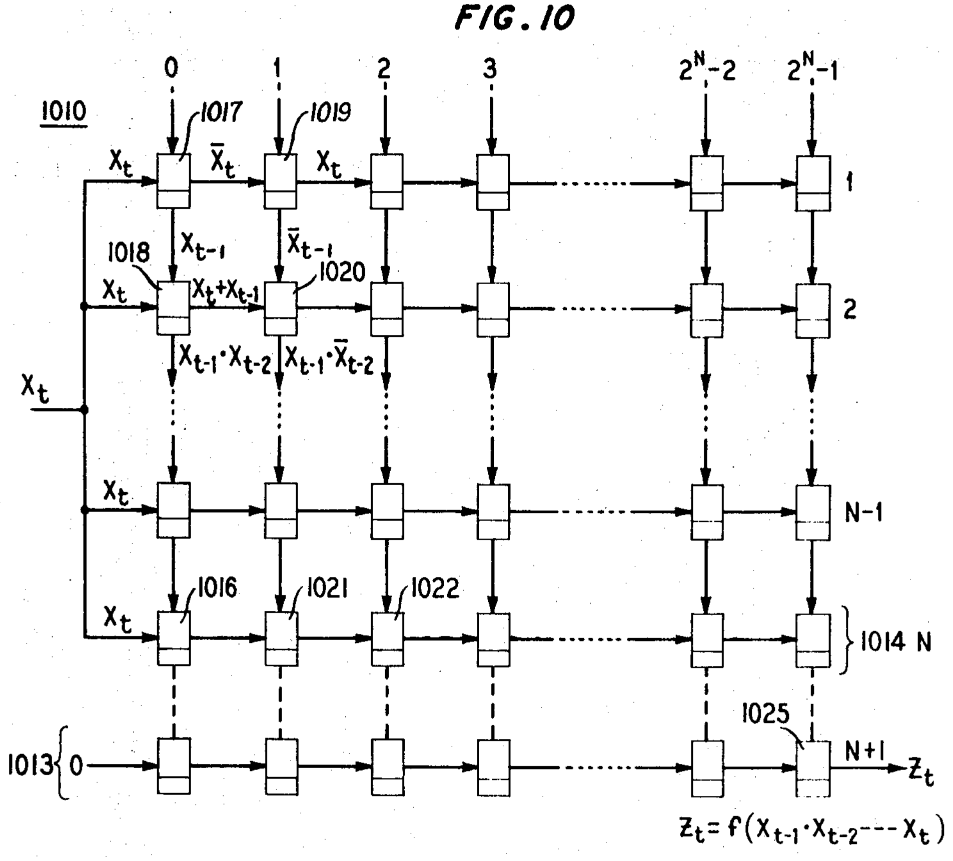
FIG. 10 shows a general $2^n$ by $n+1$ four-neighbor rectangular array of a typical embodiment of the invention.

The unreduced tree structure of FIG. 9A emphasizes the characteristics of the present invention which make it readily adaptable to batch-fabrication integrated circuit techniques. The modules are identical and the interconnections among them are simple, highly regular and unchanging regardless of the application. Programming the circuit to generate a specific function for a given input variable is accomplished by simply applying appropriate constant-valued binary input signals to input terminals of certain ones of the modules. As shown in FIG. 9A, these modules are located at one edge of the physical realization of the circuit. The result of this is that the circuit requires external control only, in the form of a set of constant-valued input signals, applied to certain externally available input terminals In a second typical embodiment of the present invention, the array takes the form of a four-neighbor rectangular array, as illustrated in FIG. 10. Again, the array comprises identical modules interconnected in a highly regular fashion. The interconnections among the modules are fixed for all flow tables, alterations to realize different functions being made at a single edge of the integrated circuit chip or other structures on which the array is constructed.

For purposes of discussion, the modules used in the typical rectangular array embodiment illustrated in FIG. 10 will be taken to comprise a half-adder circuit. Half-adder circuits are well-known in the art and any conventional half-adder circuit may be applied in the embodiment illustrated in FIG. 10. For convenience, however, one such circuit is shown in FIG. 11. Referring to FIG. 11, it is seen that AND gate 1101 logically AND's the input signals A and B to produce the carry signal C. Input signal A is also applied directly to lead 1104 of AND gate 1102 and lead 1105 of AND gate 1103. Lead 1105 is connected to an inhibit input to AND gate 1103. Input signal B is applied to lead 1107 of AND gate 1103 and lead 1106 of AND gate 1102. Lead 1106 is connected to an inhibit input to AND gate 1102. The output from AND gate 1102 is connected to lead 1108 of OR gate 1114, and the output from AND gate 1103 is connected to lead 1109 of OR gate 1114. The sum digit produced when A and B are added is available at lead 1110 and is labeled Q. The carry digit produced when A and B are added is available at lead 1111 and is labeled C. The truth table for the half-adder is indicated in FIG. 12. Module 1300 of FIG. 13 comprises a half-adder circuit 1301 of the form shown in FIG. 11. A delay circuit 1302 of standard design is connected to half-adder circuit 1301. The carry signal produced by half-adder circuit 1301 is connected to the input of delay circuit 1302. The input signal on lead 1303 of module 1301 at time $t$ is $x_t$, and the input signal on that same lead at time $t-1$ is $x_{t-1}$, and the input signal on lead 1304 at time $t$ is $y_t$, and the input signal on that same lead at time $t-1$ is $y_{t-1}$. The output signal on lead 1305 is then given by $x_t \oplus y_t$ and the output signal on lead 1306 of module 1301 is given by $x_{t-1} \cdot y_{t-1}$.

It is well known that an arbitrary function $f(x_1, x_2 \ldots x_n)$ of the variables $(x_1, x_2 \ldots x_n)$ can be formed by summing appropriate ones of the minterms of the function to be realized. For example, consider the function $F=\bar{x}_1+x_1x_2\bar{x}_3+\bar{x}_2x_3$. The sum of products expansion of this function is as follows:

$$F=x_1x_2\bar{x}_3+x_1\bar{x}_2x_3+\bar{x}_1x_2x_3+\bar{x}_1x_2\bar{x}_3+\bar{x}_1\bar{x}_2x_3+\bar{x}_1\bar{x}_2\bar{x}_3. \qquad (27)$$

Each of the terms of the expansion is, of course, a minterm.

Thus, by generating all possible minterms of a set of variables, any arbitrary function of those variables can be generated by choosing only those minterms which are included in the sum-of-products expansion of the function.

Array 1010 of FIG. 10 does precisely this, by generating all possible minterms of the input variables and by providing a means whereby selected ones of those minterms may be algebraically summed.

Figure 13:
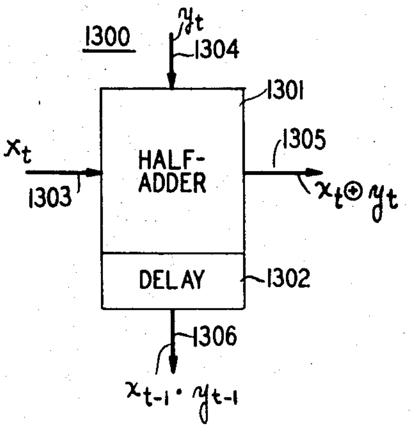
FIG. 13 shows the input-output relationship of a half-adder module having a delay circuit.

By way of illustration, consider the array of FIG. 10 having modules of the form shown in FIG. 13. The input and output relationships for module 1017 are indicated on FIG. 10. The input signals are $x_t$ and logical 1. The horizontal output is $x_t \oplus 1=\bar{x}_t$ and the vertical output is $x_{t-1}$ because of the delay. Again, module 1018 has input signals of $x_t$ and $x_{t-1}$ and output signals of $(x_t \oplus x_{t-1})$ and $(x_{t-1} \cdot x_{t-2})$. It is clear then, that the vertical output signal from the module 1016 is the minterm $(x_{t-1} \cdot x_{t-2} \cdot x_{t-3} \ldots x_{t-n})$.

The input-output relationship of module 1019 of array 1010 is indicated on FIG. 10. The vertical output signal from module 1020 is obtained by performing the logical AND function on the input signals $\bar{x}_{t-1}$ and $x_t \oplus x_{t-1}$. Noting that $x_{t-1} \cdot \bar{x}_{t-1}=0$, and applying the requisite delay, the vertical output is clearly seen to be $x_{t-1} \cdot \bar{x}_{t-2}$. Following the same procedure for each of the modules of the second column from the left of array 1010, the minterm produced at the output of module 1021 is seen to be $(x_{t-1} \cdot x_{t-2} \ldots \cdot x_{t-(n-1)} \cdot \bar{x}_{t-n})$.

The minterms produced by each column of the half-adder array of FIG. 10 are produced in a definite order. For the general $2^n$ by $n+1$ order array, the leftmost minterm us always $$x_{t-1} \cdot x_{t-t} \ldots \cdot x_{t-n}.$$

Similarly, the minterms produced by the remaining columns of the array of FIG. 10 counting from left to right, take the form $$x_{t-1} \cdot x_{t-2} \ldots x_{t-(n-1)} \cdot \bar{x}_{t-n}$$

$$x_{t-1} \cdot x_{t-2} \ldots \bar{x}_{t-(n-1)} \cdot x_{t-n}$$

$$\vdots$$

$$\bar{x}_{t-1} \cdot \bar{x}_{t-2} \ldots \bar{x}_{t-(n-1)} \cdot \bar{x}_{t-n}.$$

The minterms produced follow in the obvious pattern. If the columns are numbered starting at 0 for the leftmost column, then for column $i(i=2^a+2^b+\ldots 2^c)$, the primed variables in the minterm produced by that column are $x_{t-(n-a)}, x_{t-(n-b)}, \ldots, x_{t-(n-c)}$.

It has been clearly established, then, that all of the minterms of a set of variables $(x_1, x_2, \ldots x_{t-(n-1)}, x_{t-n})$ are available, one at each column of the array of FIG. 10. As stated above, any arbitrary function $g(x_1, x_2, \ldots x_{t-(n-1)}, x_{t-n})$ of the variables $(x_1, x_2, \ldots x_{t-(n-1)}, x_{t-n})$ can be expressed as the summation of certain ones of the minterms of the variables of that function. Consider for a moment the modules of row 1013, or the "collector" row. These modules are identical to all other modules of the array; however, only the output lead corresponding to lead 1305 (FIG. 13) of each of the modules of this row is utilized. Thus, the modules of the collector row 1013 logically OR the output signals from the modules of row 1014. For example, assuming that all the dashed lines between row 1013 and row 1014 are completed connections, the output signal from module 1016 of the leftmost column is logically OR'd with the output signal from module 1021 of the next column to the right of the leftmost column. The signal from module 1021 is then logically OR'd with the output signal from the module to the right of it in row 1014, module 1022. This procedure is repeated until all the output signals from all the modules of row 1014 have been added one to the other by the modules of collector row 1013.

The output signal from module 1025, the module in the extreme right-hand row of collector row 1013, if all the dashed connections were completed, would be the algebraic summation of all the minterms.

For purposes of illustration, it has been assumed that the dashed lines represent completed connections. The dashed lines in this typical embodiment, however, as suggested above, represent the means by which an arbitrary function can be realized. Thus, having expanded a desired function as a sum of products or minterms expression, an array can be programmed to produce that function at the output of the collector row of an array of the form of FIG. 10, by simply completing those connections which will allow the minterms of the desired function to be summed by the collector row.

To produce a function of the form $z_t=f(x_{t11}, x_{t12}, \dots x_{t1k})$ having memory $k$, it is required that there be $k+1$ rows to provide the required $k$ delays and a collector row, and that there be $2^k$ columns to provide all the $2^k$ required minterms.

As with the tree configuration discussed above, the explanation of the realization of an arbitrary function by means of the half-adder array will be facilitated by resort to illustrative examples. The first example will be directed to definite event—those generated by circuits involving no feedback variables. A subsequent example illustrates the formation of an array having only a single feedback variable.

Suppose it is desired to realize the basic flow table of FIG. 4A and the information flow table of FIG. 4B as a definite half-adder array of the form of FIG. 10. The output function is determined from block 4 of the information flow table of FIG. 4B, just as it was in the example related to the tree realization of FIG. 5A. Thus, $$z_t=(S_2+S_3+S_4)_{t-1}\cdot\bar{x}_{t11}+(S_4)_{t-1}\cdot x_{t11}. \quad (28)$$

Using the expressions developed from block 3, it is seen that $$(S_2+S_3+S_4)_t=(S_{34}+S_{15}+S_2+S_1)_{t-1}\cdot\bar{x}_{t11}+(S_\Phi)_{t-1}\cdot x_{t11} \quad (29)$$

and $$(S_4)_t=(S_{34})_{t-1}\cdot\bar{x}_{t11}+(S_\Phi)_{t-1}\cdot x_{t11}. \quad (30)$$

The output function can then be written as $$z_t=(S_{34}+S_{15}+S_2+S_1)_{t-2}\cdot\bar{x}_{t12}\cdot\bar{x}_{t11}+(S_\Phi)_{t-2}\cdot\bar{x}_{t12}\cdot x_{t11} +(S_{34})_{t-2}\cdot x_{t12}\cdot\bar{x}_{t11}+(\bar{S}_\Phi)_{t-2}\cdot x_{t12}\cdot x_{t11}. \quad (31)$$

Then, since it can be seen from the information in block 2 that $$(S_{34}+S_{15}+S_2+S_1)_t=(S_{234}+S_{15})_{t-1}\cdot\bar{x}_{t11}+(S_{234}+S_{15})_{t-1}\cdot x_{t11}$$

and $$(S_{34})_t=(S_{234})_{t-1}\cdot\bar{x}_{t11}=(S_\Phi)_{t-1}\cdot x_{t11}, \quad (32)$$

it is clear that $z_t$ can be further expanded as $$\begin{aligned} z_t=&(S_{234}=S_{15})_{t-3}\cdot\bar{x}_{t13}\cdot\bar{x}_{t12}\cdot\bar{x}_{t11} \\ &+(S_{234}+S_{15})_{t-3}\cdot x_{t13}\cdot\bar{x}_{t12}\cdot\bar{x}_{t11}+(S_\Phi)_{t-3}\cdot\bar{x}_{t13}\cdot x_{t12}\cdot\bar{x}_{t11} \\ &+(S_\Phi)_{t-3}\cdot x_{t13}\cdot x_{t12}\cdot\bar{x}_{t11}+(S_{234})_{t-3}\cdot\bar{x}_{t13}\cdot\bar{x}_{t12}\cdot x_{t11} \\ &+(S_\Phi)_{t-3}\cdot x_{t13}\cdot\bar{x}_{t12}\cdot x_{t11}+(S_\Phi)_{t-3}\cdot\bar{x}_{t13}\cdot x_{t12}\cdot x_{t11} \\ &+(S_\Phi)_{t-3}\cdot x_{t13}\cdot x_{t12}\cdot x_{t11}. \end{aligned}$$

Finally, from the information in block 1, it is seen that $$(S_{234}+S_{15})_t=(S_I)_{t-1}\cdot\bar{x}_{t11}+(S_I)_{t-1}\cdot x_{t11} \text{ and}$$
$$(S_{234})_t=(\bar{S}_I)_{t-1}\cdot x_{t11}+(S_\Phi)_{t-1}\cdot x_{t11}. \quad (34)$$

The output function can therefore be written as $$\begin{aligned} z_t=&Z_I\cdot\bar{x}_{t14}\cdot\bar{x}_{t13}\cdot\bar{x}_{t12}\cdot\bar{x}_{t11}+S_I\cdot x_{t14}\cdot\bar{x}_{t13}\cdot\bar{x}_{t12}\cdot\bar{x}_{t11} \\ &+S_I\cdot\bar{x}_{t14}\cdot x_{t13}\cdot\bar{x}_{t12}\cdot\bar{x}_{t11}+S_I\cdot x_{t14}\cdot x_{t13}\cdot\bar{x}_{t12}\cdot\bar{x}_{t11} \\ &+S_\Phi\bar{x}_{t14}\cdot\bar{x}_{t13}\cdot x_{t12}\cdot\bar{x}_{t11}+S_\Phi\cdot x_{t14}\cdot\bar{x}_{t13}\cdot x_{t12}\cdot\bar{x}_{t11} \\ &+\bar{S}_\Phi\cdot\bar{x}_{t14}\cdot x_{t13}\cdot x_{t12}\cdot\bar{x}_{t11}+S_\Phi\cdot x_{t14}\cdot x_{t13}\cdot x_{t12}\cdot\bar{x}_{t11} \\ &+S_I\cdot\bar{x}_{t14}\cdot\bar{x}_{t13}\cdot\bar{x}_{t12}\cdot x_{t11}+S_\Phi\cdot x_{t14}\cdot\bar{x}_{t13}\cdot\bar{x}_{t12}\cdot x_{t11} \\ &+S_\Phi\cdot\bar{x}_{t14}\cdot x_{t13}\cdot\bar{x}_{t12}\cdot x_{t11}+S_\Phi\cdot x_{t14}\cdot x_{t13}\cdot\bar{x}_{t12}\cdot x_{t11} \\ &+S_\Phi\cdot\bar{x}_{t14}\cdot\bar{x}_{t13}\cdot x_{t12}\cdot x_{t11}+S_\Phi\cdot x_{t14}\cdot\bar{x}_{t13}\cdot x_{t12}\cdot x_{t11} \\ &+S_\Phi\cdot\bar{x}_{t14}\cdot x_{t13}\cdot x_{t12}\cdot x_{t11}+\bar{S}_\Phi\cdot x_{t14}\cdot x_{t13}\cdot x_{t12}\cdot x_{t11}. \end{aligned} \quad (35)$$

The coefficients of this expansion determine which connections to the bottom row of the definite half-adder array are to be made. In fact, the terms of the above expansion are so ordered that in the half-adder array of FIG. 14 comprising modules of the form of FIG. 13, the $i$th column of the array counting from right to left has a connection made between the collector row and the row adjacent it if and only if the $i$th term to the right of the equal sign of Equation (35), counting from left to right, has a coefficient of $S_I$.

Thus, if $i=1$ in equation (35) the term to be considered is the first term to the right of the equal sign, or $S_I\cdot\bar{x}_{t14}\cdot\bar{x}_{t13}\cdot\bar{x}_{t12}\cdot\bar{x}_{t+1}$. The coefficient of this term is $S_I$ so there is a connection, 1400 on FIG. 14, to be made between the first column collector module 1401 and the adjacent noncollector module 1402.

Figure 14:
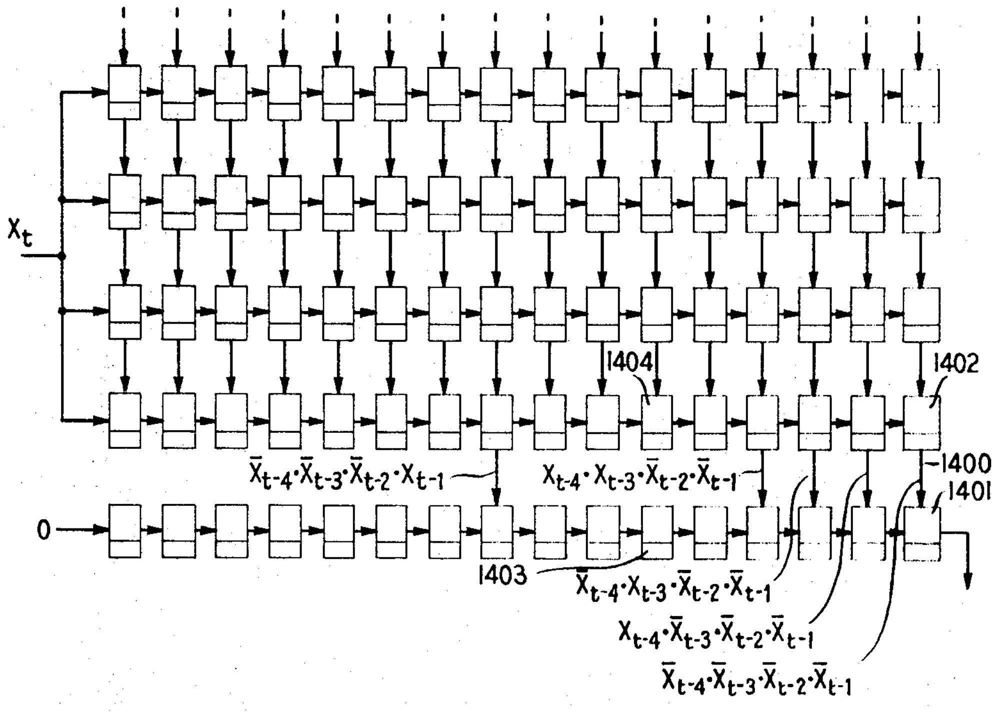
FIG. 14 illustrates a half-adder rectangular array realization of the function described by the flow tables of FIG. 4.

Similarly, if $i=6$, the sixth term to the right of the equal sign and counting from left to right, of equation (35) is the term $S_\Phi\cdot x_{t14}\cdot\bar{x}_{t13}\cdot x_{t12}\cdot\bar{x}_{t11}$. It is noted that the coefficient is $S_\Phi$ indicating no connection between the appropriate collector module and the adjacent noncollector module. Module 1403 of FIG. 14 is the sixth collector module counting the columns of the array from right to left and module 1404 is the associated noncollector module.

Each of the remaining connections or nonconnections is effected in the same manner using the method described above. FIG. 14 shows the completed array which is a realization of equation (35). Further, those minterms of equation (35) which have coefficients $S_I$ are indicated on FIG. 14.

Regular half-adder arrays—those having feedback paths—will now be considered.

Figure 15A:
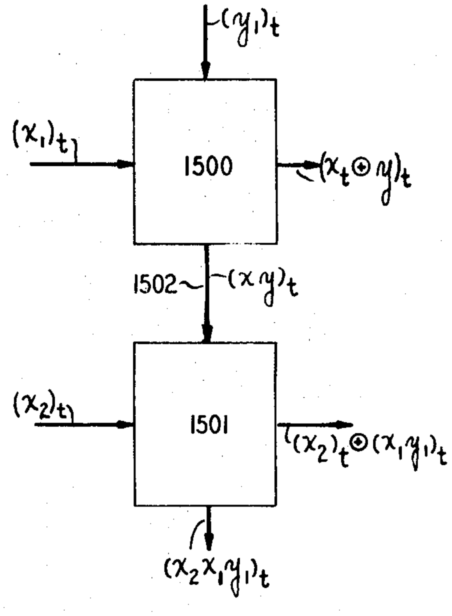
FIGS. 15A, 15B, and 15C illustrate the formation of a three-input three-output half-adder module from two two-input two-output half-adder modules.
Figure 15C:
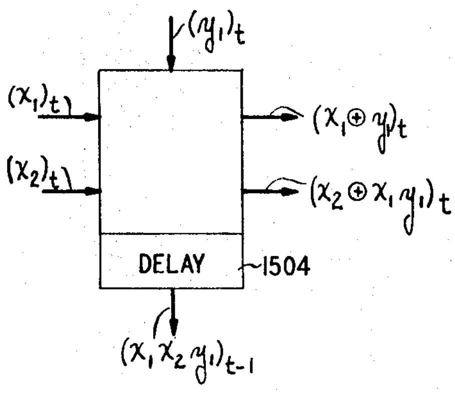
Figure 15B:
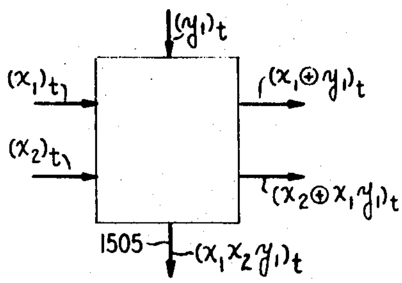

Because of the requirement that there be two input variables, one of which is the feedback variable, and one of which is the input variable, the half-adder module of FIG. 11 must be replaced by a half-adder module which can process the extra input. Such a module is shown in FIG. 15C. It is obtained by cascading two half-adders of the form of FIG. 11 and adding delay circuitry. The manner in which the modules are cascaded is shown in FIGS. 15A and 15B. The AND output on lead 1502 from half-adder 1500 serves as one of the inputs to half-adder 1501 which is identical to half-adder 1500. The outputs are as shown in FIG. 15B. FIG. 15C shows the module of FIG. 15B with memory added in the form of a delay circuit 1504 to delay the signal on lead 1505.

Figure 15D:
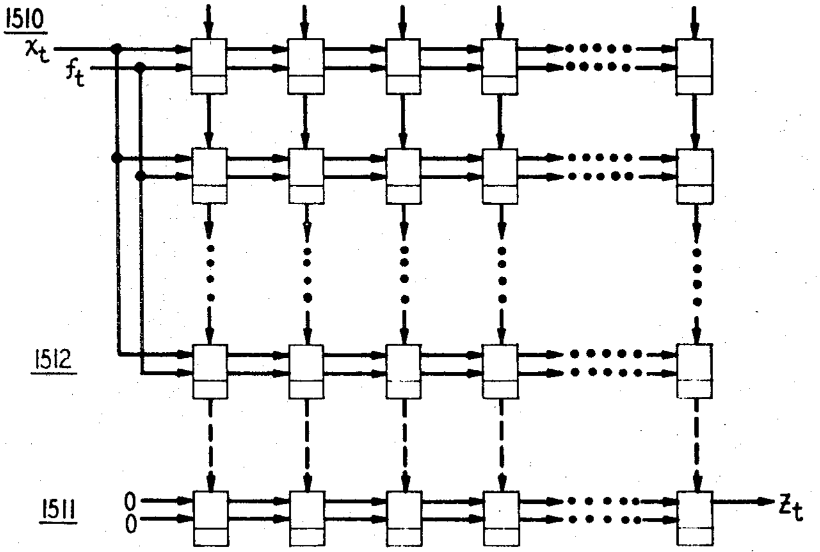
FIG. 15D shows a $2^2$ by $n+1$ rectangular array comprising modules of the form shown in FIG. 15C.

An $n$-module array 1510 comprising modules of the form of FIG. 15C is shown on FIG. 15D. The array is similar to the rectangular array discussed above. Most notably, the connections between the modules of the collector row 1511 and the adjacent row 1512 are optional depending on which of the minterms are required to specify the output function $z_t$ from the input variable $x_t$ and the feedback variable $f_t$. Consequently, the array without a feedback path is capable of forming an arbitrary combinational function of the last $k$ values of the input variables. But, it has been ascertained that a binary-input, binary-output Moore machine capable of generating an arbitrary sequential function can always be realized with such a combinational array having a single feedback variable where the feedback and output variables are given by $$f_t=f(x_{t11}f_{t11}, x_{t12}f_{t12}, \dots x_{t1k}f_{t1k})$$
$$z_t=z(x_{t11}f_{t11}, x_{t12}f_{t12}, \dots x_{t1k}f_{t1k}) \quad (36)$$

A useful feature of the complete half-adder array is that the horizontal outputs of the array are exactly the same as the inputs to the array. The feedback and output functions can be conveniently formed by placing two half-adder arrays 1600 and 1601 side by side, as illustrated in FIG. 16. The input signals to the second array are the output signals of the first array which output signals are duplicates of the input signals to the first array. Furthermore, the function $f_t$ generated by array 1600 can be fed by means of lead 1602 back to the left edge of array 1600 to aid in forming $f_{t+1}$, etcetera. Thus, any binary-input, binary-output Moore machine can be realized in the form of FIG. 16 with two cascaded half-adder arrays. The synthesis procedure is similar to that used for the definite half-adder, and will be presented in the form of an example.

Assume that the flow table of FIG. 17A is to be realized by a regular half-adder array. The first steps are identical with those used to construct the tree of FIG. 9A, discussed above. Thus, FIGS. 17B, 17C, and 17D present the pairwise implication graph, the feedback function, and the information flow table. Unlike the tree structure, however, there does not seem to be any advantage in treating the "don't care" entries one way or another. The feedback function can then be expanded as follows:

$$f_t=(S_{12}=S_{35}+S_{34})_{t-1}\cdot\bar{f}_{t11}\cdot\bar{x}_{t11}+(S_{12})_{t-1}\cdot f_{t11}\cdot\bar{x}_{t11} +(S_{12})_{t-1}\cdot\bar{f}_{t11}\cdot x_{t11}+(S_\Phi)_{t11}\cdot x_{t11}\cdot f_{t11}, \quad (37)$$

$$\begin{aligned} =&S_\Phi\cdot\bar{f}_{t12}\cdot\bar{x}_{t12}\cdot\bar{f}_{t11}\cdot\bar{x}_{t11}+S_I\cdot f_{t12}\cdot\bar{x}_{t12}\cdot\bar{f}_{t11}\cdot\bar{x}_{t11} \\ &+S_I\cdot\bar{f}_{t12}\cdot x_{t12}\cdot\bar{f}_{t11}\cdot\bar{x}_{t11}+S_I\cdot f_{t12}\cdot x_{t12}\cdot\bar{f}_{t11}\cdot\bar{x}_{t11} \\ &+S_\Phi\cdot\bar{f}_{t12}\cdot\bar{x}_{t12}\cdot f_{t11}\cdot\bar{x}_{t11}+S_I\cdot f_{t12}\cdot\bar{x}_{t12}\cdot f_{t11}\cdot\bar{x}_{t11} \\ &+S_\Phi\cdot\bar{f}_{t12}\cdot x_{t12}\cdot f_{t11}\cdot\bar{x}_{t11}+S_\Phi\cdot f_{t12}\cdot x_{t12}\cdot f_{t11}\cdot\bar{x}_{t11} \\ &-S_\Phi\cdot\bar{f}_{t-2}\cdot x_{t-2}\cdot\bar{f}_{t-1}\cdot x_{t-1}+S_\Phi\cdot f_{t-2}\cdot x_{t-2}\cdot\bar{f}_{t-1}\cdot x_{t-1} \\ &+S_\Phi\cdot\bar{f}_{t-2}\cdot\bar{x}_{t-2}\cdot f_{t-1}\cdot x_{t-1}+S_\Phi\cdot f_{t-2}\cdot\bar{x}_{t-2}\cdot f_{t-1}\cdot x_{t-1} \\ &+S_\Phi\cdot\bar{f}_{t-2}\cdot x_{t-2}\cdot f_{t-1}\cdot x_{t-1}+S_\Phi\cdot f_{t-2}\cdot x_{t-2}\cdot f_{t-1}\cdot x_{t-1}. \end{aligned} \quad (38)$$

Similarly, the output function can be expanded:

$$z_t=(S_{12}+S_{35}+S_{34})_{t-1}\cdot\bar{f}_{t11}\cdot\bar{x}_{t11}+(S_4+S_{34})_{t-1}\cdot f_{t11}\cdot\bar{x}_{t11} +(S_{12})_{t-1}\cdot\bar{f}_{t11}\cdot x_{t11}+(S_4+S_{34})_{t-1}\cdot f_{t1}\cdot x_{t11}, \quad (39)$$

$$\begin{aligned} =&S_\Phi\cdot\bar{f}_{t12}\cdot\bar{x}_{t12}\cdot\bar{f}_{t11}\cdot\bar{x}_{t11}+S_I\cdot f_{t12}\cdot\bar{x}_{t12}\cdot\bar{f}_{t11}\cdot\bar{x}_{t11} \\ &+S_I\cdot\bar{f}_{t12}\cdot x_{t12}\cdot\bar{f}_{t11}\cdot\bar{x}_{t11}+S_I\cdot f_{t12}\cdot x_{t12}\cdot\bar{f}_{t11}\cdot\bar{x}_{t11} \\ &+S_I\cdot\bar{f}_{t12}\cdot\bar{x}_{t12}\cdot f_{t11}\cdot\bar{x}_{t11}+S_\Phi\cdot f_{t12}\cdot\bar{x}_{t12}\cdot f_{t11}\cdot\bar{x}_{t11} \\ &+S_I\cdot\bar{f}_{t12}\cdot x_{t12}\cdot f_{t11}\cdot\bar{x}_{t11}+S_\Phi\cdot f_{t12}\cdot x_{t12}\cdot f_{t1}\cdot\bar{x}_{t11} \\ &+S_\Phi\cdot\bar{f}_{t12}\cdot\bar{x}_{t12}\cdot\bar{f}_{t11}\cdot x_{t11}+S_I\cdot f_{t12}\cdot\bar{x}_{t12}\cdot\bar{f}_{t11}\cdot x_{t11} \\ &+S_\Phi\cdot\bar{f}_{t-2}\cdot x_{t-2}\cdot\bar{f}_{t-1}\cdot x_{t-1}+S_\Phi\cdot f_{t-2}\cdot x_{t-2}\cdot\bar{f}_{t-1}\cdot x_{t-1} \\ &+S_I\cdot\bar{f}_{t12}\cdot\bar{x}_{t12}\cdot f_{t11}\cdot x_{t11}+\bar{S}_\Phi\cdot f_{t12}\cdot\bar{x}_{t12}\cdot f_{t11}\cdot x_{t11} \\ &+S_I\cdot\bar{f}_{t12}\cdot x_{t12}\cdot f_{t11}\cdot x_{t11}+S_\Phi\cdot f_{t12}\cdot x_{t12}\cdot f_{t11}\cdot x_{t11}. \end{aligned} \quad (40)$$

Once again, the terms have been taken in such an order that the coefficients in the expressions for $f$ and $z$, taken from left to right, yield the connection patterns for the respective arrays, taken from right to left. More explicitly, each of the terms of the equations to the right of the equal sign, counting from left to right in order, corresponds to a possible connection between modules of the array counting from right to left in order. Again, $S_I$ indicates a connection and $S_\Phi$ indicates absence of connection. Thus, the first term to the right of the equal sign of equation (38), $S_\Phi \cdot \bar{f}_{t12} \cdot \bar{x}_{t12} \cdot \bar{f}_{t11} \cdot \bar{x}_{t11}$, indicates no connection between collector module 1800 and module 1801 of array 1810, shown in FIG. 18. The second term of equation (38) to the right of the equal sign, $S_I \cdot f_{t12} \cdot \bar{x}_{t12} \cdot \bar{f}_{t11} \cdot \bar{x}_{t11}$ indicates a completed connection 1804 between collector module 1802 and module 1803. Similarly, the coefficient of each term of equation (38) dictates whether or not a connection is to be completed or not between the collector modules and the modules of the row adjacent the collector modules. Thus, the last term of equation (38), $S_\Phi \cdot f_{t12} \cdot x_{t12} \cdot f_{t11} \cdot x_{t11}$ indicates no connection between collector module 1805 and adjacent module 1806.

Figures 18, 19A, 19B:
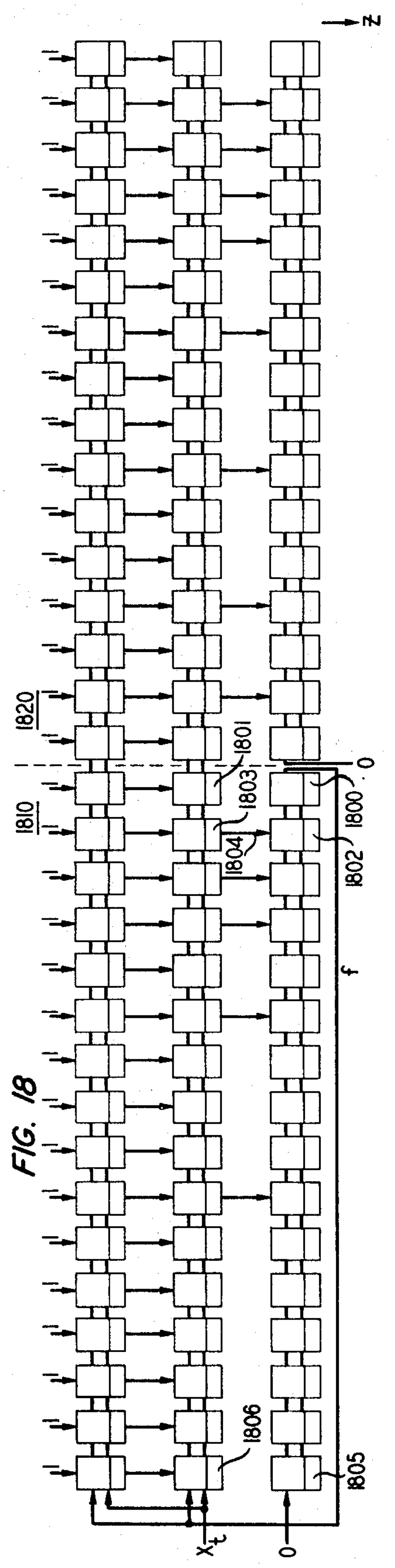
FIG. 18 shows a two-section rectangular array suitable for producing the function specified by the flow tables and implication graph of FIGS. 17A, 17B, 17C and 17D.
FIGS. 19A and 19B show flow tables which specify the behavior of a binary counter.

The exact same procedure is followed in ascertaining the connections to be made in array 1820 using equation (40). The resulting circuit realization of the tables and graph of FIGS. 17A, 17B, 17C, and 17D is shown in FIG. 18. (Note that the particular ordering of terms above assumes that the first horizontal input to each module is the feedback variable, while the second is the input variable).

The preceding examples of typical embodiments of the present invention have been illustrative of the method of operation of the circuits of the invention and the techniques applicable to the programming of those circuits. It is felt that one further example in the form of a circuit of a more familiar arrangement will be helpful to an understanding of the present invention. Thus, the binary counter characterized by the flow tables of FIGS. 19A and 19B will be developed in the form of the tree array described above.

FIGS. 19A and 19B are the basic behavior flow table and information flow table, respectively, for a binary counter. The counter will be realized as a two-tree structure of the form shown in FIG. 7. From the basic behavior flow table of FIG. 19A, it is seen that the output function $a$ is a logical 1 when the machine is in either of the states 1 or 3. Then, from block 2 of the information flow table of FIG. 19B, taking into account the "don't care" entries, it is seen that $$z_t + S_{23} \cdot \bar{x}_{t11} \cdot \bar{f}_{t11} + (S_{14}+S_1) \cdot \bar{x}_{t11} \cdot f_{t11} + (S_{23}+S_{14}+S_1) \cdot x_{t11} \cdot f_{t11} + (S_{23}+S_{14}+S_1) \cdot x_{t11} \cdot \bar{f}_{t11}. \quad (41)$$

But, since all the states of the example are represented by $S_{23}+S_{14}$, it is clear that $(S_{23}+S_{14}+S_1)=S_I$ and $(S_{23}+S_{14}+S_I)=S_I$. Thus, $$z_t = S_{23} \cdot \bar{x}_{t11} \cdot \bar{f}_{t11} + (S_{14}+S_1) \cdot \bar{x}_{t11} \cdot f_{t11} + S_I \cdot x_{t11} \cdot f_{t11} + S_I \cdot x_{t11} \cdot \bar{f}_{t11}. \quad (42)$$

Block 1 of the flow table of FIG. 19B yields the following relation for $S_{23}$ $$(S_{23})_{t-1} = S_{1234} \cdot \bar{x}_{t12} \cdot \bar{f}_{t12} + S_\Phi \cdot \bar{x}_{t12} \cdot f_{t12} + S_\Phi \cdot x_{t12} \cdot f_{t12} + S_\Phi \cdot x_{t12} \cdot \bar{f}_{t12}. \quad (43)$$

Again, noting that $S_{1234}=S_I$, it is seen that $$(S_{23})_{t-1} = S_I \cdot \bar{x}_{t12} \cdot \bar{f}_{t12} + S_\Phi \cdot \bar{x}_{t12} \cdot f_{t12} + S_\Phi \cdot x_{t12} \cdot f_{t12} + S_\Phi x_{t12} \cdot \bar{f}_{t12}. \quad (44)$$

Similarly, $$(S_{14}+S_1{}^*)_{t-1} = S_\Phi \cdot \bar{x}_{t12} \cdot \bar{f}_{t12} + S_{1234} \cdot \bar{x}_{t12} \cdot f_{t12} + S_\Phi \cdot x_{t12} \cdot f_{t12} + S_\Phi \cdot x_{t-2} \cdot \bar{f}_{t-2}. \quad (45)$$

Again, since $S_{1234}+S_I$, it is seen that $$(S_{14}+S_1{}^*)_{t-1} = S_\Phi \cdot \bar{x}_{t12} \cdot \bar{f}_{t12} + S_I \cdot \bar{x}_{t12} \cdot f_{t12} + S_\Phi \cdot x_{t12} \cdot f_{t12} + S_\Phi \cdot x_{t12} \cdot \bar{f}_{t12}. \quad (46)$$

In the same manner, it is seen from the basic behavior flow table of FIG. 19A that $f$ is a logical 1 when the machine is in one of the states 3 or 4. From block 2 of the information flow table of FIG. 19B, it is seen that $$f_t = (S_{23})_{t-1} \cdot \bar{x}_{t11} \cdot \bar{f}_{t11} + (S_{23}+S_1{}^*)_{t-1} \cdot \bar{x}_{t11} \cdot f_{t11} + (S_1{}^*)_{t-1} \cdot x_{t11} \cdot f_{t11} + S_\Phi \cdot x_{t11} \cdot \bar{f}_{t11}. \quad (47)$$

Arbitrarily choosing $S_1$ to be logical 0, $$f_t + (S_{23})_{t-1} \cdot \bar{x}_{t11} \cdot \bar{f}_{t11} + (S_{23}+S_1{}^*)_{t-1} \cdot \bar{x}_{t11} \cdot f_{t11} + S_\Phi \cdot x_{t11} \cdot f_{t11} + S_\Phi \cdot x_{t11} \cdot \bar{f}_{t11}. \quad (48)$$

Similarly, block 1 shows that $$(S_{23})_{t-1} + S_{1234} \cdot \bar{x}_{t12} \cdot \bar{f}_{t12} + S_\Phi \cdot \bar{x}_{t12} \cdot f_{t12} + S_\Phi \cdot x_{t12}) \text{ and that}$$

$$(S_{23})_{t-1} = S_{1234} \cdot \bar{x}_{t-2} \cdot \bar{f}_{t-2} + S_\Phi \cdot \bar{x}_{t-2} \cdot f_{t-2} + S_\Phi \cdot x_{t-2} \cdot f_{t-2} + S_\Phi \cdot x_{t-2} \cdot \bar{f}_{t-2}. \text{ or,} \quad (49)$$

$$(S_{23})_{t-1} = S_I \cdot \bar{x}_{t-2} \cdot \bar{f}_{t-2} + S_\Phi \cdot \bar{x}_{t-2} \cdot f_{t-2} + S_\Phi \cdot x_{t-2} \cdot f_{t-2} + S_\Phi \cdot x_{t-2} \cdot \bar{f}_{t-2}, \text{ and that} \quad (50)$$

$$(S_{23}+S_1{}^*)_{t-1} = S_{1234} \cdot \bar{x}_{t12} \cdot \bar{f}_{t12} + S_\Phi \cdot \bar{x}_{t12} \cdot f_{t12} + S_{1234} \cdot x_{t12} \cdot f_{t12} + S_{1234} \cdot x_{t12} \cdot \bar{f}_{t12} \quad (51)$$

$S_{1234}$, which may take any value, will be arbitrarily assigned the value of $S_\Phi$ or logical 0 for convenience. Thus, $$(S_{23}+S_1{}^*)_{t-1} = S_I \cdot \bar{x}_{t12} \cdot \bar{f}_{t12} + S_\Phi \cdot \bar{x}_{t12} \cdot f_{t12} + S_\Phi \cdot x_{t12} \cdot f_{t12} + S_\Phi \cdot x_{t12} \cdot \bar{f}_{t12}. \quad (52)$$

Figure 19C:
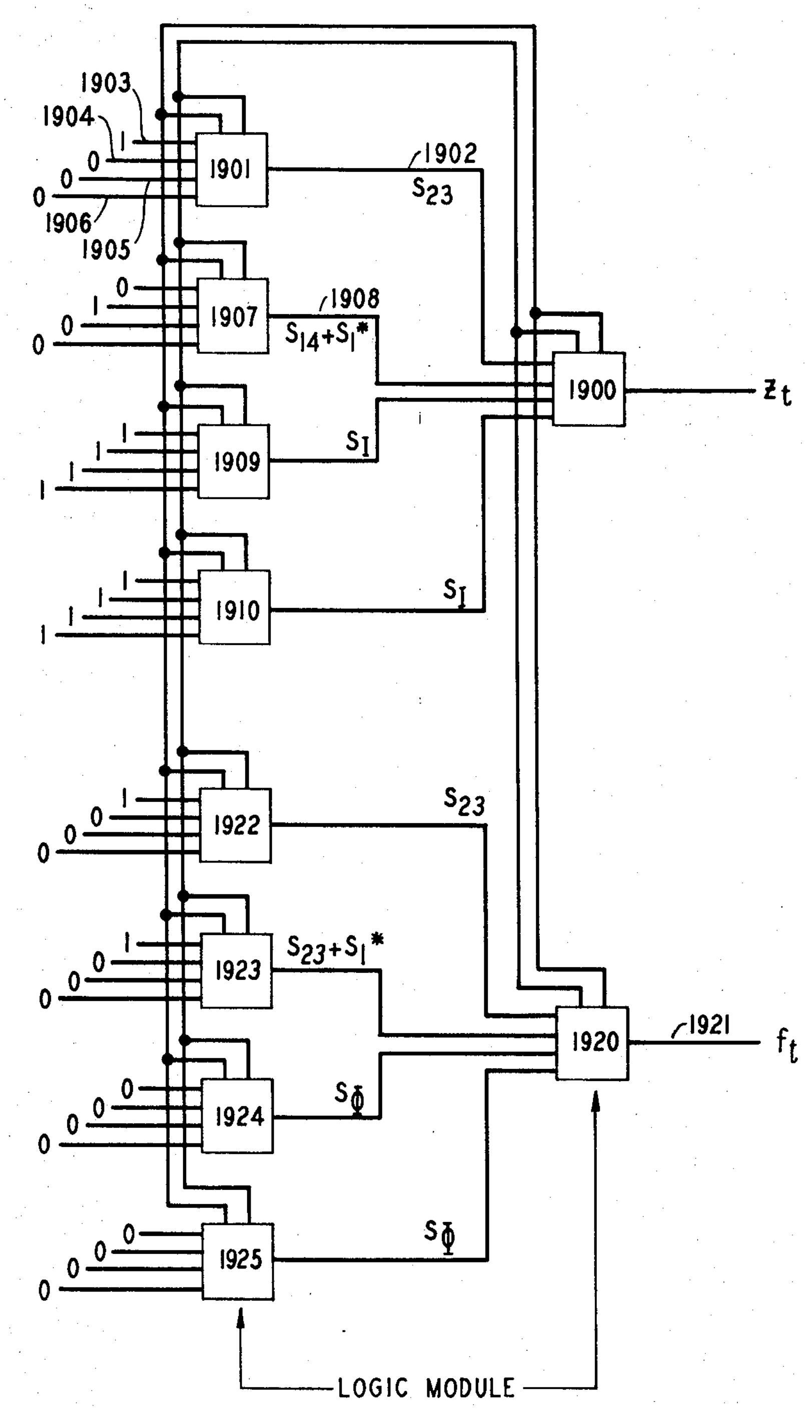
FIG. 19C depicts a circuit realization of the function described by the flow tables of FIGS. 19A and 19B.

The circuit representation of these equations is shown in FIG. 19C. Equation (42) indicates the signals required by module 1900 to produce the output function $z$. Keeping in mind that $S_\Phi=0$ and $S_I=1$, equation (43) indicates the input signals required by module 1901 to produce $S_{23}$ at output lead 1902. Thus, a logical 1 on input lead 1903, and logical 0's on each of the leads 1904, 1905, and 1906 produce $S_{23}$ on lead 1902. Similarly, equation (45) indicates the input signals to module 1907 required to produce $(S_{14}+S_1{}^*)$ on output lead 1908. Each of the modules 1909 and 1910 produce output signals which are always logical 1's. The input signals to these modules are therefore always logical 1's.

In the manner, equation (47) indicates the input signals required at module 1920 to produce $f$ at output lead 1921. Equation (50) specifies the input/output relation for module 1922 and equation (52) specifies the input/output relation for module 1923. The input signals to modules 1924 and 1925 must be logical zeros to produce output signal $S_\Phi$.

While the above-detailed description has presented a manual procedure for composing the various tables, deriving the logic equations and ultimately specifying the interconnection of the component modules, it is clear that this procedure could be most readily practiced using a digital computer. (Such procedures are well known in the art, see for example Bartee, T. C., "Automatic Design of Logical Networks," 1959 Proceedings of the Western Joint Computer Conference, pp. 103–107.) This is especially true where the desired logic function is of higher order complexity than was encountered in the relatively simple examples given above. In particular, the method of selecting the required points of the constant-valued signals, or the required connections, as the case may be, is readily programmable for a given standard integrated circuit chip or other two-dimensional configuration.

Although I have described my invention in detail in a number of typical embodiments and therefore have utilized certain specific terms and language herein, it is to be understood that the present disclosure is illustrative, rather than restrictive and that changes and modifications may be resorted to without departing from the spirit or scope of the claims appended hereto. In particular, it is to be understood that the arrays of the typical embodiments, specifically, tree arrays and rectangular arrays, are illustrative only and any equivalent array can be substituted therefor.

It is also to be noted that, while the above discussion has been based on a machine having the singular aspects of, namely, a single output signal, a single input signal and a single feedback signal, it is clear that one skilled in the art can readily adapt these teachings to a finite state machine having corresponding multiple-function aspects. These adaptations will proceed in accordance with well-defined teachings for converting other single-function systems to multiple-function systems. The basic concepts of the present invention apply equally to the circuit having single-function aspects as to circuits having multiple aspects.

It has been noted in the above discussion that certain redundancies exist in the use of a complete array when only a portion of this array is structurally necessary to generate the desired function. These redundant modules may be turned to advantage for purposes of improving the reliability of operation of the machine; that is, they may be employed to perform error-detection functions in accordance with conventional procedures.

What is claimed is:

1. A circuit for generating any arbitrary sequential function comprising an array logic block having input and output means, said array logic block comprising at least one two-dimensional array of identical, fixedly interconnected component modules, each of said component modules having memory means, wherein said circuit further comprises a single feedback path connecting the output of one of said arrays to said input means of said array logic block.

2. A circuit according to claim 1, wherein said component modules are connected in a tree configuration to form each of said arrays.

3. A circuit according to claim 1 wherein said arrays of component modules each comprise a four-neighbor rectangular arrangement of said component modules, said component modules being connected to form the rows and columns of said rectangular arrangement.

4. A circuit according to claim 3 wherein each of said component modules comprises a half-adder logic configuration.

5. A circuit according to claim 3 wherein each of said arrays further comprises a plurality of collector modules, said collector modules being connected to each other to form a row, and each of said collector modules being selectively connected to corresponding ones of said component modules appearing in an exterior row of said rectangular arrangement.

6. A circuit according to claim 5 wherein each of said component modules and each of said collector modules comprises a half-adder logic configuration.

7. A circuit for generating any arbitrary sequential switching function comprising at least one logic module array having input and output terminals, said array including a plurality of identical logic modules fixedly interconnected in a highly regular manner, each of said logic modules comprising logic circuitry and delay means, selected ones of said modules being located at an edge of a two-dimensional arrangement of said array, and means connected to said selected modules responsive to external stimuli, for programming said array to produce at its output terminals a specified function of the variables at its input terminals.

8. A circuit according to claim 1 wherein certain ones of said modules of said logic array comprise error-detecting circuits.

9. A sequential switching circuit for generating desired sequences of circuit output signals in response to applied sequences of circuit input signals, said switching circuit comprising at least one tree array logic circuit comprising a plurality of component modules interconnected to form a tree configuration, said component modules each comprising logic circuitry and delay means, each of said tree array logic circuits thereby providing tree array output signals at one extremity of each of said tree configurations in response to tree array input signals applied at one or more of said component modules of said tree array logic circuit, means for applying said sequences of input signals to each component module of each of said tree array logic circuits, and means for applying constant-valued input signals to selected ones of said component modules.

10. The switching circuit of claim 9 wherein said tree array logic circuits are each arranged in a two-dimensional array and wherein said selected ones of said component modules are positioned adjacent an edge of said two-dimensional array.

11. The switching circuit of claim 10 further comprising means for applying output signals from at least one of said tree array logic circuits as feedback signals to selected ones of said component modules of selected ones of said tree array logic circuits.

12. A sequential switching circuit for generating desired sequences of circuit output signals in response to applied sequences of circuit input signal comprising at least one rectangular array logic circuit comprising a plurality of component modules interconnected to form a rectangular configuration, said component modules each comprising logic circuitry and delay means, each of said rectangular array logic circuits thereby providing rectangular array output signals at one extremity of each of said rectangular configurations in response to rectangular array input signals applied at one or more of said component modules of said rectangular array logic circuit, means for applying said sequences of input signals to each component module of each of said rectangular array logic circuits, means for applying constant-valued input signals to selected ones of said component modules, and means for selectively connecting selected ones of said component modules to other selected ones of said component modules.

13. The switching circuit of claim 12 further comprising means for applying output signals of one of said rectangular array logic circuits as a feedback signal to selected ones of said component modules of selected ones of said rectangular array logic circuits.

14. The switching circuit of claim 13 wherein said rectangular array logic circuit is characterized by having a four-neighbor array configuration.

15. The switching circuit of claim 13 wherein said component modules of said rectangular array logic circuit each comprise a half-adder logic configuration.

16. In a programmable finite state machine for realizing sequential functions, said machine having memory $n$, said machine further having at least one array of $(n+1)$ by $2^n$ functionally identical logic circuit modules, $n$ by $2^n$ of which are arranged in a regularly interconnected two-dimensional rectangular configuration having $n$ rows of $2^n$ modules, said configuration having a left and right side, a top and bottom, with the output signals of a given module applying input signals to adjacent modules, one of said adjacent modules located to the right of and one of said adjacent modules located below said given module, the method of programming said machine comprising the steps of 1. generating at least one set of signals corresponding to all possible minterms of said sequential function,
2. generating a first ordered sequence of signals corresponding to an information flow table representation of said sequential function,
3. generating a second ordered sequence of signals corresponding to a minimized version of said first ordered sequence, said minimized version comprising terms representative of the null set and identity set only, and
4. interconnecting selected ones of the remaining row of $2^n$ modules to the bottom row of said configuration corresponding to said second ordered sequence of signals.

17. The method of realizing sequential functions according to claim 16 further comprising the steps of 1. generating a third ordered sequence of signals corresponding to the breaking of all loops of the implication graph representation of said sequential function,
2. generating a fourth ordered sequence of signals corresponding to a minimized version of said implication graph representation of said sequential function, said minimized version comprising terms representative of the null set and identity set only, and
3. summing selected ones of a different set of minterms corresponding to said ordered sequence of signals corresponding to said implication graph minimized version of said sequential function.

18. In a finite state machine for realizing sequential functions, said machine having at least one array of functionally identical logic circuit modules, said modules being arranged in a regularly interconnected two-dimensional tree configuration having columns arranged from left to right, each of said modules having a number of external input terminals and a number of internal input terminals, the leftmost column having the largest number of said modules and the rightmost column having the least, the output from the modules of each of said columns, except the rightmost column, forming the internal input signals to the modules of the adjacent column to the right, said leftmost column having constant-valued internal input signals only, the method of programming said machine comprising 1. generating an ordered sequence of internal input signals for each module of each column of said array to the right of said leftmost column said ordered sequence corresponding to entries in an information flow table representation of said sequential function,
2. generating a minimized ordered sequence of signals for said leftmost column, said minimized version comprising terms representative of the null set and identity set only, and
3. applying a logic 1 signal to each internal input term of each module of said leftmost column requiring an internal input signal corresponding to the identity set of said flow table minimized version and applying a logic 0 signal to each internal input terminal of each module of said leftmost column requiring an input signal corresponding to the null set as characterized by said flow table minimized version of said sequential function.

19. The method of realizing sequential functions according to claim 18 further comprising the steps of 1. generating a different ordered sequence of signals corresponding to the breaking of all loops of the implication graph representation of said sequential function,
2. generating a different minimized ordered sequence of signals for said leftmost column, said minimized version comprising terms representative of the null set and identity set only, and
3. applying a logic 1 signal to each internal input terminal of each module of said leftmost column requiring an internal input signal corresponding to the identity set of said flow table different minimized version and applying a logical 0 signal to each internal input terminal of each module of said leftmost column requiring an input signal corresponding to the null set, as characterized by said flow table minimized version of said sequential function.

* * * * *